(12) United States Patent
Finney

(10) Patent No.: US 6,658,387 B2
(45) Date of Patent: Dec. 2, 2003

(54) METHOD FOR INDEXING AN IMAGE DURING AN AUTOMATED TAKEOFF ESTIMATE OF A CONSTRUCTION DRAWING

(75) Inventor: Samuel W. Finney, Philadelphia, PA (US)

(73) Assignee: Fastlane Construction Software Inc., Philadelphia, PA (US)

( * ) Notice: Subject to any disclaimer, the term of this patent is extended or adjusted under 35 U.S.C. 154(b) by 72 days.

(21) Appl. No.: 09/975,235

(22) Filed: Oct. 11, 2001

(65) Prior Publication Data

US 2002/0013704 A1 Jan. 31, 2002

Related U.S. Application Data

(62) Division of application No. 09/575,005, filed on May 19, 2000.

(51) Int. Cl.[7] ............... G10L 15/00; G06F 17/18
(52) U.S. Cl. .......... 704/270; 706/923; 700/236
(58) Field of Search .......... 345/676; 700/102, 700/104, 107, 117, 236; 706/923; 704/275, 270

(56) References Cited

U.S. PATENT DOCUMENTS

| 4,370,707 A | 1/1983 | Phillips et al. |
|---|---|---|
| 4,388,610 A | 6/1983 | Tsunekawa |
| 4,451,895 A | 5/1984 | Sliwkowski |
| 4,578,768 A | 3/1986 | Racine |
| 4,700,318 A | 10/1987 | Ockman |
| 4,782,448 A | 11/1988 | Milstein |
| 4,811,243 A | 3/1989 | Racine |
| 4,882,685 A | 11/1989 | van der Lely |
| 4,885,694 A | 12/1989 | Pray et al. |
| 4,964,060 A | 10/1990 | Hartsog |
| 5,111,392 A | 5/1992 | Malin |
| 5,189,606 A | 2/1993 | Burns et al. |
| 5,255,207 A | 10/1993 | Cornwell |
| 5,299,307 A | 3/1994 | Young |
| 5,389,917 A | 2/1995 | LaManna et al. |
| 5,485,507 A | 1/1996 | Brown et al. |
| 5,526,520 A | 6/1996 | Krause |
| 5,546,564 A * | 8/1996 | Horie ............ 703/1 |
| 5,625,827 A | 4/1997 | Krause et al. |
| 5,774,357 A | 6/1998 | Hoffberg et al. |
| 5,839,104 A | 11/1998 | Miller et al. |
| 5,893,082 A | 4/1999 | McCormick |
| 5,918,219 A | 6/1999 | Isherwood |
| 5,933,769 A | 8/1999 | Kaneko |
| 6,324,508 B1 | 11/2001 | Finney |

* cited by examiner

Primary Examiner—Daniel Abebe
(74) Attorney, Agent, or Firm—Caesar, Rivise, Bernstein, Cohen & Pokotilow, Ltd.

(57) ABSTRACT

A method is taught for determining construction quantity takeoff information of a drawing representative of a construction project having a plurality of information units including at least units of construction project information and information regarding a plurality of items associated with a drawing in an information gathering system. The method includes applying an indicia representative of a selected information unit of the plurality of information units to the information gathering system and determining the selected information unit by the information gathering system in accordance with the applied indicia. Indexing the selected information unit and storing the indexed information unit in an indexed takeoff base are also included. Image data representative of the drawing is provided and the image data is indexed for storing the image data in the indexed database in association with indexed information unit.

36 Claims, 22 Drawing Sheets

| Record # | Column 1 Date/Time Stamp | Col. 2 Image Data | Col. 3 Measurement entry mode | Col. 4 Location coordinate info | Col. 5 Project ID/ link field to project data | Col. 6 Sheet ID | Col. 7 Loca-tion ID | Col. 8 Item ID/ Cost & Schedule link field | Col. 9 Speech Engine return string | Col. 10 Filtered string | Col. 11 Corrected string | Col. 12 Computed value | Col. 13 Range Flag |
|---|---|---|---|---|---|---|---|---|---|---|---|---|---|
| 0 | 2/8/00 15:36 | 0095-0099, video01 | digitizer | 45.00N, 115.00W | 1 | | Room 106 | | | | | | |
| 1 | 2/8/00 15:37 | 0100-0206, video01 | speech | 45.00N, 115.00W | 1 | A-1 | Room 106 | Paint | 12.00 feet times 6.00 feet plus 4.50 square feet equals | 12 * 6 + 4 = | 12 * 6 + 4 = | 76 | 0 |
| 2 | 2/8/00 15:44 | 0206-0225, video01 | speech | 45.00N, 115.00W | 1 | A-1 | Room 106 | Paint | 4.00 feet times 12.00 feet equals | 4 * 12 = | 4 * 12 = | 48 | 0 |
| 3 | 2/8/00 15:47 | 0226-0251 | digitizer | 45.00N, 115.00W | 1 | A-1 | Room 106 | carpet | | | | 436.5 | 0 |
| 4 | 2/8/00 15:48 | 0252-0253 | speech | 45.00N, 115.00W | 1 | A-1 | Room 106 | recepticals | 7plus 1 plus 1 plus 6 equals | 7+1+1+6 = | 7+1+1+6 = | 15 | 0 |
| 5 | 2/8/00 15:51 | 0254-0260 | speech | | 1 | A-1 | Room 108 | carpet | 6 point to ate plus 48.08 equals | 6. To ate + 48.08 = | 6.28+48.08 = | 54.36 | 0 |

400

SAMPLE SCRIPT

VERBAL DICTATION REQUIRED FOR CREATION OF QUANTITY TAKEOFF DATA
EXAMPLE:
COMMAND WORDS ARE SHOWN IN BOLD

412

RECORD #0

| VERBAL DICTATION | MACHINE ACTIONS |
|---|---|
| DIGITIZE COORDINATES | DATE/TIME STAMP FIELD FILLED WITH CURRENT DATE TIME<br>VIDEO INDEX START POSITION STORED TO MEMORY. |
| LOCATION ROOM 106 | LOCATION SETS FOCUS TO LOCATION ID FIELD. LOCATION ID FIELD FILLED WITH "ROOM 106" |
| (OPERATOR USES DIGITIZER TO ENTER COORDINATES FOR ROOM 106 AS EITHER A RANGE OR A POINT.) | MACHINE CONVERTS DIGITIZER INPUT TO USEABLE COORDINATE SYSTEM. FOR EXAMPLE, THE DIGITIZER INPUT COULD BE COMBINED WITH THE PROJECT'S GEOGRAPHIC COORDINATES TO CREATE A GEOGRAPHIC COORDINATE FOR THE LOCATION. |
| | VIDEO START/STOP TIME RECORDED. |

RECORD #1

| VERBAL DICTATION | MACHINE ACTIONS |
|---|---|
| SHEET A-1 | DATE/TIME STAMP FIELD FILLED WITH CURRENT DATE TIME<br>VIDEO INDEX START POSITION STORED TO MEMORY<br>SHEET SET FOCUS TO SHEET ID FIELD; "A-1" IS ENTERED INTO FIELD. |
| LOCATION ROOM 106 | LOCATION SETS FOCUS TO LOCATION ID FIELD. LOCATION ID FIELD FILLED WITH "ROOM 106" |
| ITEM PAINT | ITEM ID FIELD FILLED WITH "PAINT", OR "PAINT" IS FOUND IN A TABLE OF COST/SCHEDULE DATA AND ID IS FILLED. |
| QUANTITY TWELVE POINT ZERO ZERO FEET TIMES SIX POINT ZERO ZERO FEET PLUS FOUR POINT FIVE ZERO SQUARE FEET EQUALS | MACHINE FILTERS AND PASSES STRING, COMPUTES VALUE OF STRING, RECORD INDEX STOP VALUE FOR VIDEO IMAGE. MACHINE RECORDS SPEECH ENGINE, FILTERED, AND CORRECTED STRING VALUES AND COMPUTED VALUES. MACHINE RECORDS IMAGE DATA AS START + STOP INDEX VALUE, AND FILE LOCATION/NAME INFORMATION. |

FIG. 7A

RECORD #2                                                                 412

| VERBAL DICTATION | MACHINE ACTIONS |
|---|---|
| QUANTITY FOUR POINT ZERO ZERO FEET TIMES TWELVE POINT ZERO ZERO FEET EQUALS | MACHINE FILTERS AND PASSES STRING, COMPUTES VALUE OF STRING, RECORD INDEX STOP VALUE FOR VIDEO IMAGE. MACHINE RECORDS SPEECH ENGINE, FILTERED, AND CORRECTED STRING VALUES AND COMPUTED VALUES. MACHINE RECORDS IMAGE DATA AS START + STOP INDEX VALUE, AND FILE LOCATION/NAME INFORMATION. |
|  | DATE/TIME STAMP FIELD FILLED WITH CURRENT DATE TIME<br>VIDEO INDEX START POSITION STORED TO MEMORY |
|  | LOCATION ID FIELD FILLED WITH "ROOM 106" |
|  | ITEM ID FIELD FILLED WITH "PAINT", OR "PAINT" IS FOUND IN A TABLE OF COST/SCHEDULE DATA AND ID IS FILLED. |
| (NOTE: REPEATING QUANTITY KEYWORD WITHOUT ANOTHER KEYWORD CAUSES PREVIOUS RECORD VALUES TO BECOME DEFAULT FIELD VALUES FOR NON-QUANTITY FIELDS, EXCEPT AS NOTED.) |  |

RECORD #3

| VERBAL DICTATION | MACHINE ACTIONS |
|---|---|
| ITEM CARPET | ITEM ID FIELD FILLED WITH "CARPET", OR "CARPET" IS FOUND IN A TABLE OF COST/SCHEDULE DATA AND ID IS FILLED. |
| DIGITIZE | MACHINE RECEIVES INPUT FROM DIGITIZER, RECORD INDEX STOP VALUE FOR VIDEO IMAGE.<br>MACHINE RECORDS COMPUTED VALUES. MACHINE RECORDS IMAGE DATA AS START + STOP INDEX VALUE, AND FILE LOCATION/NAME INFORMATION. |
|  | DATE/TIME STAMP FIELD FILLED WITH CURRENT DATE TIME<br>VIDEO INDEX START POSITION STORED TO MEMORY |
|  | LOCATION ID FIELD FILLED WITH "ROOM 106" |
|  | ITEM ID FIELD FILLED WITH "PAINT", OR "PAINT" IS FOUND IN A TABLE OF COST/SCHEDULE DATA AND ID IS FILLED. |
| (NOTE: ITEM KEYWORD WITHOUT A PRECEDING SHEET OR LOCATION KEYWORD |  |

RECORD #4
SIMILAR TO RECORD #2, EXCEPT ITEM RECEPTACLES, QUANTITY....

RECORD #5

| VERBAL DICTATION | MACHINE ACTIONS |
|---|---|
| LOCATION ROOM 108 | FOCUS SET TO LOCATION FIELD. "ROOM 108" ENTERED INTO FIELD. VIDEO INDEX START POSITION STORED TO MEMORY. DATE TIME STAMP FIELD FILLED WITH CURRENT DATE/TIME. |
| ITEM CARPET | ITEM ID FIELD FILLED WITH "CARPET", OR "CARPET" IS FOUND IN A TABLE OF COST/SCHEDULE DATA AND ID IS FILLED. |
| QUANTITY SIX POINT TWO EIGHT PLUS FORTY-EIGHT POINT ZERO EIGHT EQUALS | MACHINE FILTERS STRING AND FINDS ERROR (UNKNOWN TEXT VALUES), ARITHMETIC ERROR CORRECTION ROUTINE INVOKED. USER CORRECTS ERROR IN ERROR CORRECTION FORM, CLICKS OR SAYS "OK". VALUE IS THEN REFILTERED AND PROCESSING CONTINUES: COMPUTES VALUE OF STRING, RECORD INDEX STOP VALUE FOR VIDEO IMAGE. MACHINE RECORDS SPEECH ENGINE, FILTERED, AND CORRECTED STRING VALUES AND COMPUTED VALUES. MACHINE RECORDS IMAGE DATA AS START + STOP INDEX VALUE, AND FILE LOCATION/NAME INFORMATION. |
| (NOTE: LOCATION KEYWORD WITHOUT A PRECEDING SHEET KEYWORD CAUSES DEFAULT VALUE TO BE COPIED FROM PREVIOUS RECORD.) (NOTE: NO LOCATION COORDINATE INFO IS ENTERED FOR THIS ROOM 108) | |

REPORT MODULE

EXAMPLES OF REPORTS TO BE PRODUCED FROM TAKEOFF DATA, COST/SCHEDULE DATA

TAKEOFF DATA REPORTS

| TAKEOFF DATA | REMARKS |
|---|---|
| ITEM, QUANTITY SORTED BY SHEET | ERROR CHECKING, COMPARES ITEMS FOUND ON PARTICULAR SHEETS (DRAWINGS) |
| ITEM, QUANTITY SORTED BY LOCATION | FINDS ALL ITEMS IN A PARTICULAR LOCATION REGARDLESS OF SHEET LOCATION |
| ITEM, QUANTITY SORTED BY PROJECT | SUMMARY OF QUANTITIES |
| ITEM, QUANTITY SORTED BY ESTIMATOR | WHO DID WHAT TAKEOFF |
| ITEM, QUANTITY, LOCATION SORTED BY ITEM, QUANTITY | REVEALS RELATIVE SIZE OF WORK BY LOCATION, AND MAY REVEAL LOCATION OF TAKEOFF ERRORS. |
| ITEM, QUANTITY, LOCATION, IMAGE SORTED BY ITEM | PRESENTS QUANTITY ALONG WITH PHYSICAL SPACE REPRESENTATION ALL ON ONE PAGE FOR RAPID REVIEW. SUCH A PRESENTATION ALSO FREES OTHERS FROM THE NEED TO VIEW PLANS WHILE STUDYING TAKEOFF DATA. |
| GROUP DATA BY LOCATION COORDINATES | PERMITS STUDY OF MATERIALS DELIVERY, AND DISTRIBUTION OF WORK USING GEOGRAPHICAL INFORMATION SYSTEM TECHNIQUES. |

COST DATA REPORTS

| COST DATA: TAKEOFF + STANDARD COSTS | REMARKS |
|---|---|
| ITEM, QUANTITY, COST SORTED BY SHEET | ERROR CHECKING COMPARES COST OF ITEMS FOUND ON PARTICULAR SHEETS (DRAWINGS) AND INDICATES WHICH DRAWINGS REPRESENT THE HIGHEST COSTS AND THEREFORE WHICH DRAWINGS DEMAND MOST CAREFUL ATTENTION. |
| ITEM, QUANTITY, COST SORTED BY LOCATION | FINDS ALL ITEMS IN A PARTICULAR LOCATION REGARDLESS OF SHEET LOCATION. FIND COST BY LOCATION. PLAN SUPERVISION REQUIREMENTS, SECURITY REQUIREMENTS, DEVELOP LOCATION-BASED ACCOUNTING AND MATERIAL DELIVERY SYSTEMS. |
| ITEM, QUANTITY, COST SUMMARIZED BY PROJECT | SUMMARY OF QUANTITIES, STANDARD COST |
| ITEM, QUANTITY, COST SORTED BY ESTIMATOR | WHO DID WHAT TAKEOFF? HOW MUCH COST BY ESTIMATOR. PERMITS WEIGHTING OF ESTIMATOR'S WORK BASED UPON MANAGEMENT'S ASSESSMENT OF ESTIMATOR'S AGGRESSIVENESS. |
| ITEM, QUANTITY, COST, LOCATION, IMAGE SORTED BY ITEM | PRESENTS QUANTITY AND COST ALONG WITH PHYSICAL SPACE REPRESENTATION ALL ON ONE PAGE FOR RAPID REVIEW. SUCH A PRESENTATION ALSO FREES OTHERS FROM THE NEED TO VIEW PLANS WHILE STUDYING TAKEOFF DATA. |
| GROUP DATA BY LOCATION COORDINATES | PERMITS STUDY OF COST, MATERIALS DELIVERY, AND DISTRIBUTION OF WORK USING GEOGRAPHICAL INFORMATION SYSTEM TECHNIQUES. |

SCHEDULE DATA REPORTS

| COST DATA: TAKEOFF + STANDARD COSTS+ SCHEDULE INFO | REMARKS 780 |
|---|---|
| ITEM, QUANTITY, COST, SCHEDULED DURATION | THE ADDITION OF SCHEDULE DATA AT THE TAKEOFF PHASE OF WORK WILL ASSIST IN PLANNING THE PROJECT FOR BIDDING. AFTER AWARD OF THE PROJECT, DEVELOPED STANDARD SCHEDULE DATA WILL ASSIST IN CREATION OF THE FINAL CRITICAL PATH SCHEDULE FOR THE PROJECT.<br><br>AN ADDITIONAL POTENTIAL ADVANTAGE OF STANDARDIZED PRODUCTION RATES IS THAT CONTRACTORS WILL BE ABLE TO REQUEST MODIFIED PRODUCTION RATES FROM SUB-CONTRACTORS TO ASSIST IN DEVELOPMENT OF THE SCHEDULE.<br><br>A FURTHER ADVANTAGE OF SCHEDULE DATA LINKED WITH A DETAILED QUANTITY TAKEOFF IS THAT THE SCHEDULE CAN BE EFFICIENTLY LOADED WITH COST, LABOR, MATERIALS, EQUIPMENT AND SUPPLIES INFORMATION WITHOUT ADDITIONAL DATA ENTRY.<br><br>A FURTHER ADVANTAGE OF STANDARDIZED SCHEDULE DATA WILL BE THE CREATION OF COMMON REFERENCE SCHEMES FOR THE VIEWING AND MODIFYING OF PROJECT DATA ACROSS MANY PROJECTS. A COMMON DIFFICULTY IN THE INDUSTRY IS INTERPRETATION OF THE MEANING OF EACH SCHEDULE ACTIVITY. |

FIG. 13C

METHOD FOR INDEXING AN IMAGE DURING AN AUTOMATED TAKEOFF ESTIMATE OF A CONSTRUCTION DRAWING

RELATED APPLICATION

This Application is a Divisional of U.S. patent application, Ser. No. 09/575,005, filed on May 19, 2000 entitled AUTOMATED METHOD FOR A TAKEOFF ESTIMATE OF CONSTRUCTION DRAWINGS, whose disclosure is incorporated by reference herein and which is assigned to the same assignee as this invention.

FIELD OF THE INVENTION

This invention is related to an automated method for performing a construction quantity takeoff estimate.

BACKGROUND OF INVENTION

In the construction industry, it is necessary to estimate the total costs of the materials and other items required for a construction project prior to starting the project in order to determine the total cost of the project. It is customary for an estimator performing such an estimate to make the estimate using the blueprints that have been prepared for the project. The estimator reviews each blueprint required to specify the project and determines the total quantity of each item required by the blueprint. It is common for each contracting entity in the construction industry to perform its own quantity takeoff for its own needs.

The determinations made by an estimator when performing a quantity takeoff estimate include determinations of the total area over which an item is required or the total quantity of an item required in the blueprints. For example, the takeoff estimator can determine the total area of a type of carpeting that is required for a construction project or the total number of electrical outlets required for the project by reviewing the blueprints. The determinations often must be made for all surfaces and/or materials in the construction project, including vertical surfaces. In combination with the cost per unit for each required item, the estimator uses the quantity determinations to estimate the total cost of all the items specified by the blueprints.

One well known method of performing a takeoff estimate is the manual method. In the manual method the estimator used a ruler or other measurement device to manually measure the various areas specified by the blueprint and recorded the information on a notepad. This method of recording quantities was tedious. In a manual estimation the estimator added a number of manually measured and calculated quantities using, for example, a paper notepad in order to determine the total quantity wherein a particular item was specified.

For example, using manually measured and calculated quantities designated on a blueprint as requiring a particular type of carpet, the estimator estimated the total area of the carpet. The manually determined areas obtained in this manner were noted and scaled by the estimator according to the scaling set forth on the blueprint. Additionally, the estimator manually counted and noted the number of electrical outlets and manually measured the length of the different types of wire and piping. The values determined and noted from the blueprint in this manner were added together in order to determine the totals for each item on the blueprint.

All of the takeoff information manually determined from a blueprint in this manner was manually indexed to the blueprint from which it was gathered in order to permit the quantity takeoff information to be associated with the blueprint at a later time. The estimator then proceeded to the next blueprint and determined the takeoff information in the same manner. When all of the blueprints were processed the estimator added the values obtained for each item from each of the blueprints of the collection of blueprints in order to determine the total in the entire project for each item.

Alternately, estimators performed the manual estimation method by selecting an item for determination and proceeding from one blueprint to another, adding up all of the occurrences of the selected item on all of the blueprints. For example, the estimator proceeded through the blueprints of a construction project and measured all of the areas requiring a specified type of tile on each blueprint. The total requirements were then determined by adding the amounts required by all of the blueprints. This was repeated for each item.

In order to limit the number of errors that can occur when performing the manual estimation method, the estimator customarily checked off each item as it was measured or counted and each area of a blueprint when it was completed. While the determinations with respect to certain countable items, such as electrical outlets, could be performed relatively efficiently using one of the manual methods, the manual methods of performing the construction quantity takeoff estimates were typically very laborious. Additionally, the manual methods were error prone. Errors made in performing these estimates resulted in waste due to under ordering or over ordering items or errors in bidding due to mis-counting items for the construction project.

Another method of performing estimates from construction blueprints was by determining the areas corresponding to the items specified by the blueprints using a digitizer rather than manual measurements. When performing a digitizer method of area quantity takeoff the estimator touched a digitizer pen to each corner of or traced the perimeter of an area of a blueprint to be measured. Provided the estimator thereby defined a closed polygon the total area bounded by and the total length of the lines connecting the points touched by the digitizer pen was calculated by a computer that is coupled to the digitizer. Digitizers can be advantageously applied in this manner to irregularly shaped areas specified in a blueprint and also applied to calculation of line lengths of linear building features and counts of unit building features.

The application of digitizers to calculating material and cost estimates from plans such as blueprints is taught in U.S. Pat. No. 4,578,768, issued on Mar. 25, 1986, to Racine (the '768 Patent). In the embodiment taught by the '768 Patent an L-shaped frame includes linear microphones that are disposed at a right angle with respect to each other on a flat surface in order to provide a sensor assembly. The blueprint is disposed upon the flat surface adjacent the sensor assembly. Points on the blueprints are touched by a hand held stylus adapted to emit a sound when touched to the surface. In this manner, the system taught by the '768 Patent determines the X-Y coordinates of the locations touched by the stylus. A keyboard entry device is also taught, as well as a printer and a video display for providing representations of information such as material and cost estimates.

A menu is provided on the flat surface of the digitizer in order to permit the estimator to use the stylus for indicating functions and information, such as units conversions, and programs for calculating weights. A plurality of different menus can be used. Thus, using the method taught by the '768 Patent, the estimator must repeatedly move the stylus back and forth between the blueprint and the menu in order to enter both the blueprint information and the functions and information set forth on the menu.

U.S. Pat. No. 4,782,448, issued on Nov. 1, 1988 to Milstein, teaches another prior art device for estimating the costs of a construction project. The device taught by Milstein includes a hand held stylus and a digitizer having a menu. The system of Milstein permits an estimator to indicate component parts, sizes, and scale factors using the menu. Based upon the input information received from the stylus a computer coupled to the digitizer counts the number of each size of each component and calculates the total length of pipes and other components.

U.S. Pat. No. 4,811,243, issued on Mar. 7, 1989, to Racine (the '243 Patent) teaches another system for calculating data such as material and cost estimates from plans such as blueprints. In the '243 Patent a digitizer device determines the X-Y coordinates by means of a stylus. The '243 Patent also teaches the use of a voice recognition unit to receive input information from the estimator and to convert the voice commands of the user into computer control signals. The computer control signals operate the computer and initiate selected computer programs for performing construction estimates. The system taught by the '243 Patent does not permit the estimator to enter numerical data using the voice recognition unit. Thus, an estimator using the system of the '243 Patent must repeatedly move the stylus back and forth between the blueprint and the menu in order to enter both the blueprint information and the functions and information of the menu.

Therefore, the use of digitizer systems within the prior art of takeoff estimates can require excessive repetitive motion by the estimators resulting in slower takeoff estimates. The excessive repetitive motion puts estimators using the digitizer systems at risk for injuries such as carpel tunnel syndrome. Furthermore, digitizer systems are difficult to transport, require too much space to be conveniently set up, and are expensive.

Another problem with using known digitizer systems for performing quantity takeoff estimates is that it is difficult for an estimator to freely switch from one blueprint to another. The difficulty occurs because a blueprint must be securely fastened to the flat surface of a digitizer in order to prevent any movement of the blueprint with respect to the flat surface that would result in inaccurate measurements. The secured blueprint must therefore be detached from the flat surface in order to permit switching to another blueprint. Since such switching between blueprints is an operation that is frequently performed during quantity takeoff estimates, difficulty in performing the switching is a serious drawback.

U.S. Pat. No. 5,389,917, issued to LaManna on Feb. 14, 1995, teaches a lightweight data entry terminal having a microphone adapted to be worn by the user on a lapel while the user performs a function such as inventory management. Entry of data such as product codes can be performed by verbal pronouncements into the microphone as well as by optical scanning using the system taught by LaManna. The data acquired by LaManna in this manner is transmitted to a central communication center. The LaManna system does not perform the calculations necessary for the inventory management function in response to user instructions.

Another prior art method of performing takeoff estimates uses computer aided drafting (CAD) drawings. When CAD representations of the blueprint information are available to estimators it is possible to automate the determination of certain required quantity information for the items specified by the blueprint. In the CAD method of performing takeoff estimates CAD representations are inputted directly into a computer. The computer is programmed to receive the CAD representations and calculate some of the information required for preparing takeoff estimates therefrom. Devices for receiving CAD drawings in this manner can determine the dimensions of selected areas defined on the blueprints.

However, CAD representations of the blueprint information are not readily available to contractors within the construction industry. One reason for the lack of availability of CAD representations is that many areas of the construction industry are still distrustful of computerized methods. Furthermore, the known devices do not provide takeoff estimate reports or all of the information required to provide such reports.

For the various methods of determining takeoff information, computer network-based construction services for distributing the takeoff information after it is determined are known in the prior art. The prior art distribution services include automated commerce and procurement performed within systems where a network of buyers and sellers automatically negotiate purchases and sales in accordance with information distributed within the network.

Another prior art construction service available within computer networks is a project hosting service. In the project hosting service computer storage and distribution and tracking of project documents is provided by way of a computer network. Another prior art service offered includes marketing and prospecting services. While these services available within computer networks may rely upon abstracted takeoff data, none of these services develops or distributes raw construction project data that serves the basis for construction quantity takeoff work.

SUMMARY OF THE INVENTION

A method for performing a construction quantity takeoff estimate of a drawing representative of a construction project having a plurality of items includes applying first vocal indicia representative of a selected item of the plurality of items to a voice recognition system and producing and first electrical signals representative of the first vocal indicia by the voice recognition system. The selected item is first determined by the voice recognition system in accordance with the first electrical signals. Second vocal indicia representative of a quantity of the selected item are applied to the voice recognition system and second electrical signals representative of the quantity of the selected item are produced. The quantity of the selected item is second determined by the voice recognition system in accordance with the second electrical signals. The takeoff estimate is performed in accordance with the first and second determining.

DESCRIPTION OF THE DRAWINGS

FIG. 5 shows the structure of a database file for receiving and storing input information received by the construction quantity takeoff system of FIG. 1 and indexing the received information with its identifying information;

FIGS. 7A–C show a plurality of charts setting forth verbal dictations performed by an estimator in order to apply input information to the construction quantity takeoff system of FIG. 1 and thereby provide the database file of FIG. 5;

FIGS. 13A–C show a plurality of charts setting forth examples of the reports provided by the construction quantity takeoff system of FIG. 1.

DETAILED DESCRIPTION OF THE PREFERRED EMBODIMENT

Figure 1A:
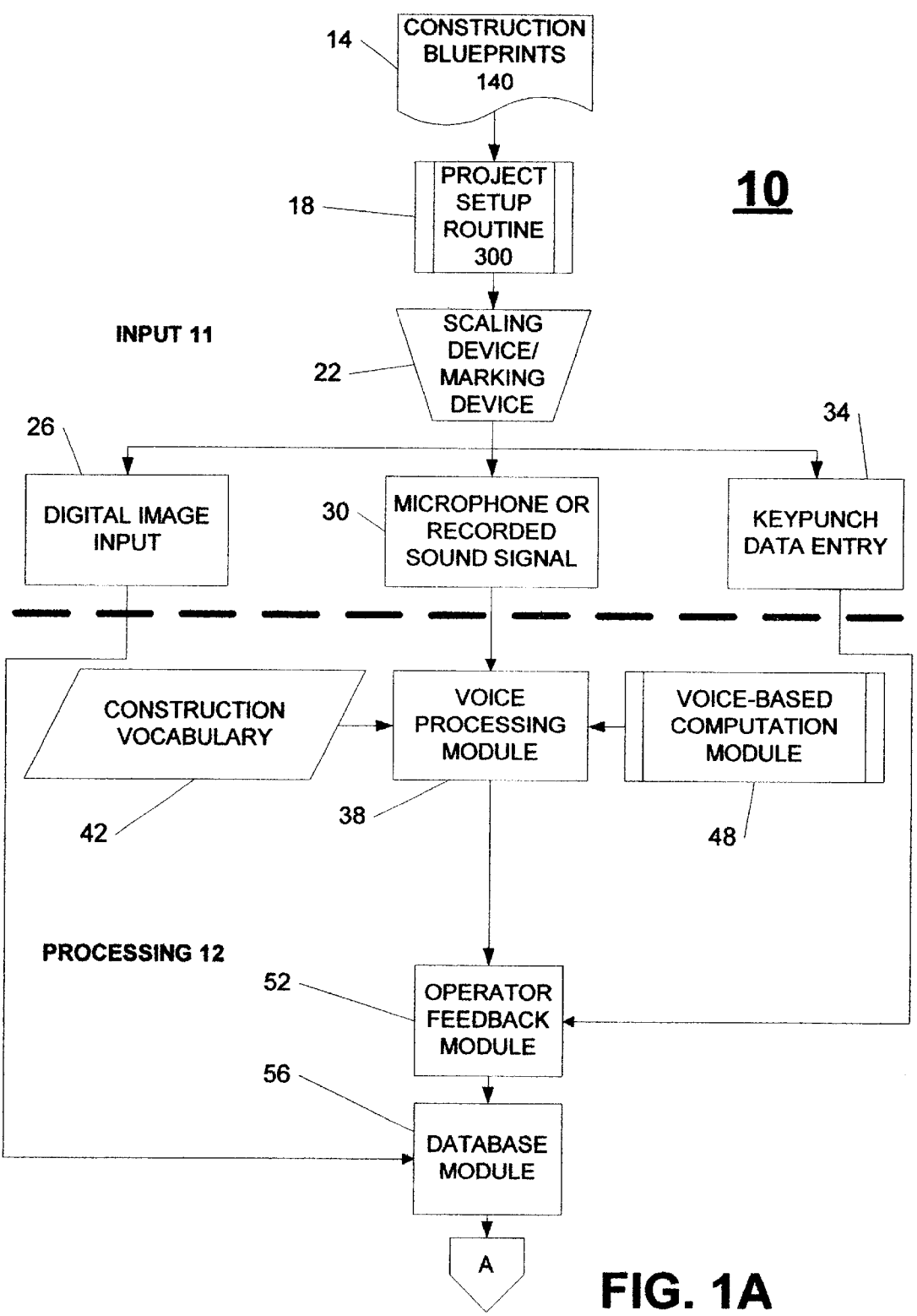
FIGS. 1A, B show a block diagram representation of the construction quantity takeoff system of the present invention.
Figure 1B:
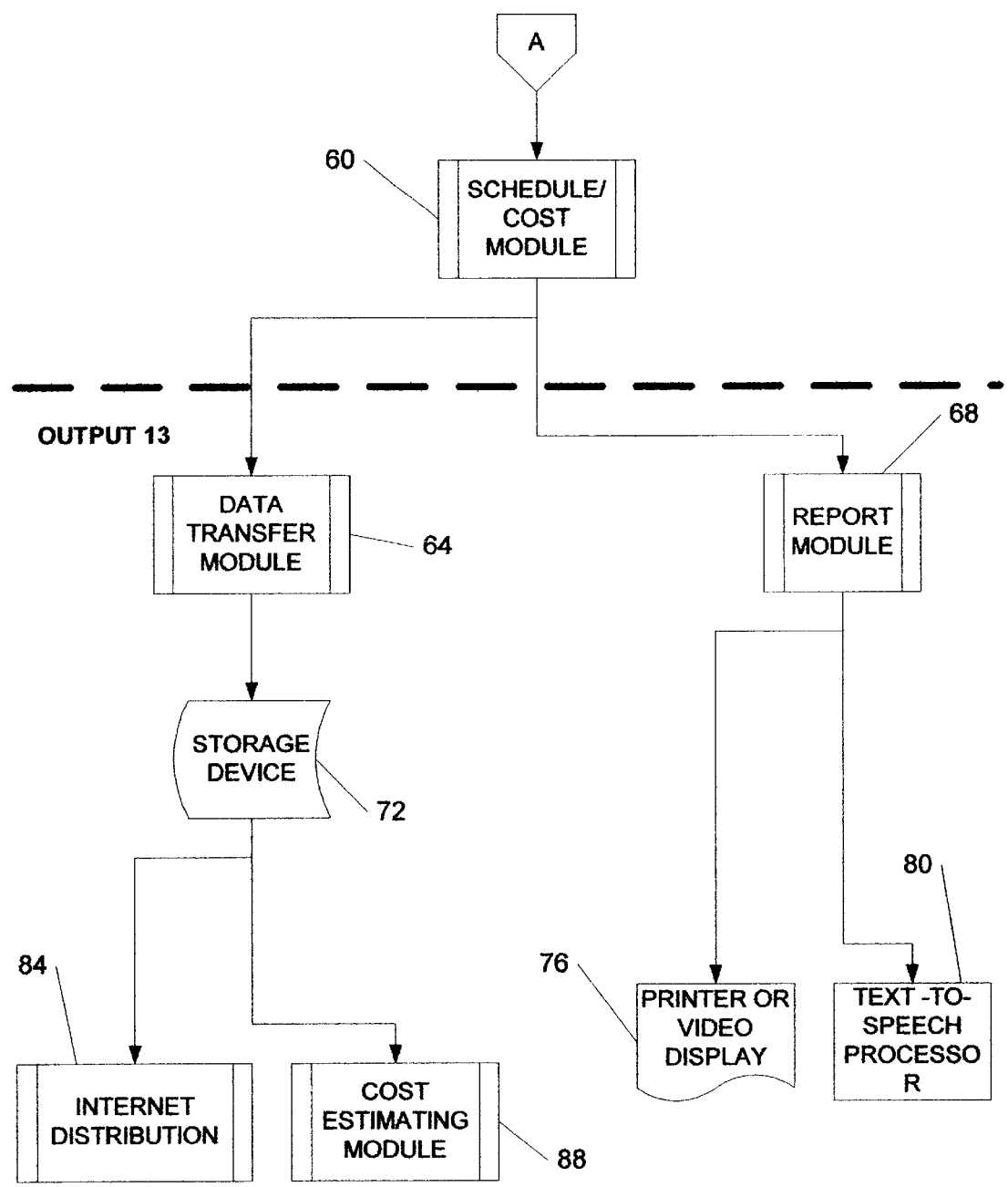

Referring now to FIGS. 1A, B, there is shown a block diagram representation of construction quantity takeoff system 10 of the present invention. Construction quantity takeoff system 10 is advantageously applied to the task of estimating the cost of the materials required for a construction project. The construction project can be represented by construction blueprints 140, as shown in input block 14, or any other device for representing the construction project to the estimator. In the preferred embodiment of the invention, construction quantity takeoff system 10 is a voice recognition based system wherein the estimator can verbally input the information required to perform the quantity takeoff estimate.

Construction quantity takeoff system 10 includes input section 11, processing section 12, and output section 13. Within input section 11 of construction quantity takeoff system 10 project set up routine 300 is run as shown in block 18. Project set up routine 300 includes the operations necessary to enable quantity takeoff system 10 to receive and store setup information for later identifying the input information obtained. Information received by quantity takeoff system 10 within project set up routine 300 can include information such as the location and name of the construction project and any other information useful for indexing the input information obtained during the estimate. Project set up routine 300 is described in further detail below.

Additionally, scaling devices and marking devices can be coupled verbally or electronically (device permitting) to construction quantity takeoff system 10 as shown in block 22 if desired by the estimator. The scaling and marking devices can include, for example, measurement scales, pens, papers, and planimeters. If a planimeter is used it can be electrically coupled to construction quantity takeoff system 10. Furthermore, the estimator can choose any other tools desired for applying input information to quantity takeoff system 10 by coupling the further tools to takeoff system 10 and programming quantity takeoff system 10 to receive the input information of the further tools. Using any of these input devices the estimator is permitted to input item information in any order and from any location in blueprints 140.

The input information of takeoff system 10 can also be entered as digital image input as shown in block 26, microphone or recorded sound signals as shown in block 30, and keypunch data entry as shown in block 34. The digital image input of block 26 can be provided by a conventional digitizer input device or any other type of input device that produces image type data such as a still or video camera. Block 26 permits image data to be associated and stored directly with quantity information.

In the preferred embodiment of the invention, as previously described, the input information of quantity takeoff system 10 is provided in the form of electrical signals representative of human voice. The voice signals can be provided by microphone 104a, a previously recorded voice source, or any other source of audio signals representative of a voice. Within processing section 12 of quantity takeoff system 10, the input voice signals of block 30 are applied to voice processing module 38 for processing according to the method of the present invention. The operations performed within voice processing module 38 are described in more detail below. Voice processing module 38 can be formed by adapting a conventional speech engine well known to those skilled in the art. A construction vocabulary appropriate for the particular construction project, as well as predetermined voice based computation models, are applied to the voice processing module 38 as shown in blocks 42, 48.

The output string of voice processing module 38 is applied to an estimator feedback module as shown in block 52. The estimator feedback module of block 52 determines whether there are any identifiable errors in the output string of voice processing module 38. If any errors are identified within block 52, the feedback module provides the estimator with feedback indicating the identified errors. The feedback provided to the estimator for some errors includes asking the estimator what was intended.

The speech processor of processing section 12 of quantity takeoff system 10 can be trained to reduce the likelihood of recurring errors. The training of the speech processor is performed using appropriate speech recognition techniques. Whether no errors are detected or errors are detected and corrected in the estimator feedback module of block 52 the output string of block 38 is stored in the database module of quantity takeoff system 10 as shown in block 56. The database file of module 52 is described in more detail below.

If the input information applied to quantity takeoff system 10 is digital image input, as shown in block 26, it can be applied directly to the database module of block 56. If the input information applied to quantity takeoff system 10 is keypunch data input, as shown in block 34, it can be applied directly to the operator feedback module of block 52 for a determination of errors prior to applying it to the database module of block 56. When all of the input information representing the items of the construction project is collected within the database module of block 56, it is applied to scheduling and cost routine 700 within block 60.

In output section 13 of quantity takeoff system 10 the scheduling and cost information determined in block 60 is applied to a data transfer module as shown in block 64. The output information from block 64 can then be transmitted under the control of the estimator to any other party using quantity takeoff system 10. The information transmitted in this manner is stored in a storage device as shown in block 72. From the storage device of block 72, the output information can be distributed by way of the internet as shown in block 84. The output information can also be applied to a cost estimating module as shown in block 88. The output information of block 88 can be distributed in any manner designated by the estimator to permit other processing for cost estimating.

Additionally, the output information of block 60 can be applied to a report module as shown in block 68. The report module of block 60 provides report information for the estimator or other parties. When the report information of block 68 is provided to the estimator, it can be represented using a printer or a video display as shown in block 76. Additionally, the report information can be converted into speech and acoustically provided to the estimator as shown in block 80. Furthermore, any other method of presenting the reports can be used within construction quantity takeoff system 10.

Thus, construction quantity takeoff system 10 provides cost and schedule data that can be distributed by way of a computer network. Computer network distribution of quantity takeoff, image, cost and schedule data replaces previous methods of communication of project data with more effective methods and fosters new business methods within the construction industry. When takeoff information and the standard cost and schedule data and image data are distributed in this manner the entire industry benefits from improved productivity.

Using the quantity takeoff distribution provided by quantity takeoff system 10, entities in the construction industry acquire or offer for sale takeoff information from or to a central source or distributed sources in a timely manner. The information can be used in a traditional manner to develop estimates and bids on construction projects. The information can also be used in many other ways such as customizing and automating marketing and prospecting since construction industry entities then have access to job details previously only available after significant investments of time and effort. A centralized data source can also permit meaningful development of statistical tools to study the cost parameters of construction projects.

Project takeoff, cost, and schedule data is provided or received by way of a computer network to any number requesting computers using the data provided by quantity takeoff system 10. The data can be packaged as requested for transmission in the network. Fees are then collected and payed according to supply and demand for the information distributed.

In one example of a method performed according to block 84 within quantity takeoff system 10 a prospecting general contractor may wish to locate projects within its geographic territory that are compatible with its capabilities. The general contractor can request from the database a list of projects within a range of standard costs for a bid. The requested projects can be selected by the contractor to include items of work that the contractor typically performs. They can also be selected according to any other criteria desired.

In another method performed according to quantity takeoff system 10, a general contractor can complete a takeoff project for bid and load its takeoff information into a database for sale and distribution to other contractors seeking project data. The sale and distribution of the takeoff information can be by way of a computer network. Researchers, subcontractors, material men, labor unions, government agencies, project manufacturers, and other entities can be among the parties receiving the takeoff information.

A subcontractor can purchase takeoff information that pertains only to its trade and use the purchased takeoff data as a basis for estimating a project or determining if a project is of interest. The subcontractor can then submit its bid directly to the appropriate general contractors. Alternately, the subcontractor can submit the bid back to the computer network using the format of the takeoff received from the network. The general contractor can use data received in this manner to prepare a job schedule and cost report.

A seller of materials specified by blueprints 140 can purchase a list of the materials required in the construction project specified by blueprints 140 and applied to construction quantity takeoff system 10. In view of the list of materials obtained in this manner the seller can schedule delivery location-by-location based upon the takeoff data available in the network. A contractor awarded a construction project can use the takeoff data of the construction project to establish its own project control system including cost accounting, scheduling and project management functions. A construction information service provider can use the takeoff data from quantity takeoff system 10 as preliminary data for the provision of services in its system.

Examples of further methods performed in accordance with construction quantity takeoff system 10 include, but are not limited to, the following. A government agency can purchase project takeoff information in order to determine the labor content of a project or to determine the permit requirements of the project. A takeoff specialist can sell project data to the system.

Figure 2A:
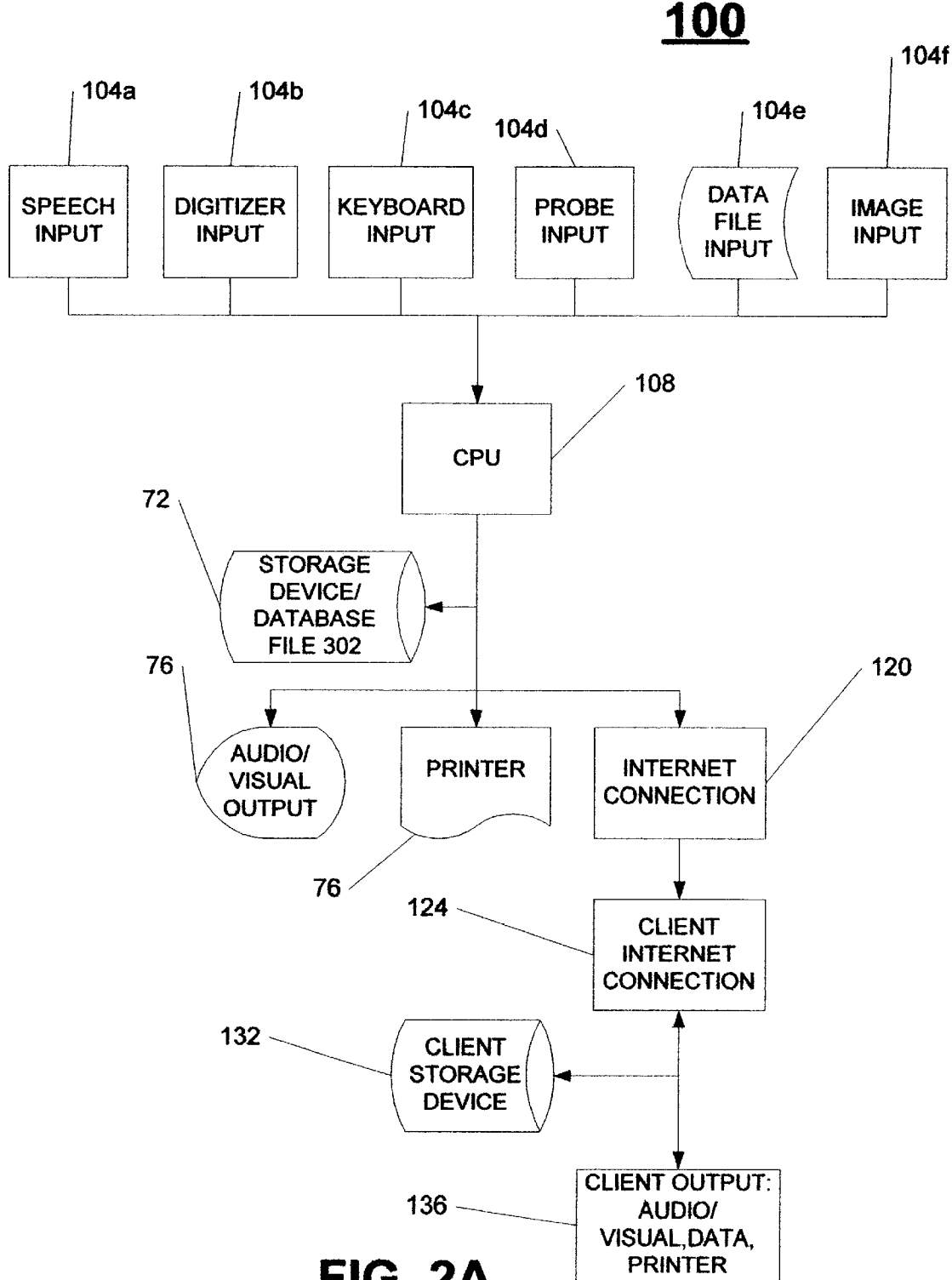
FIGS. 2A, B show hardware representations of devices suitable for use in the construction quantity takeoff system of FIG. 1.
Figure 2B:
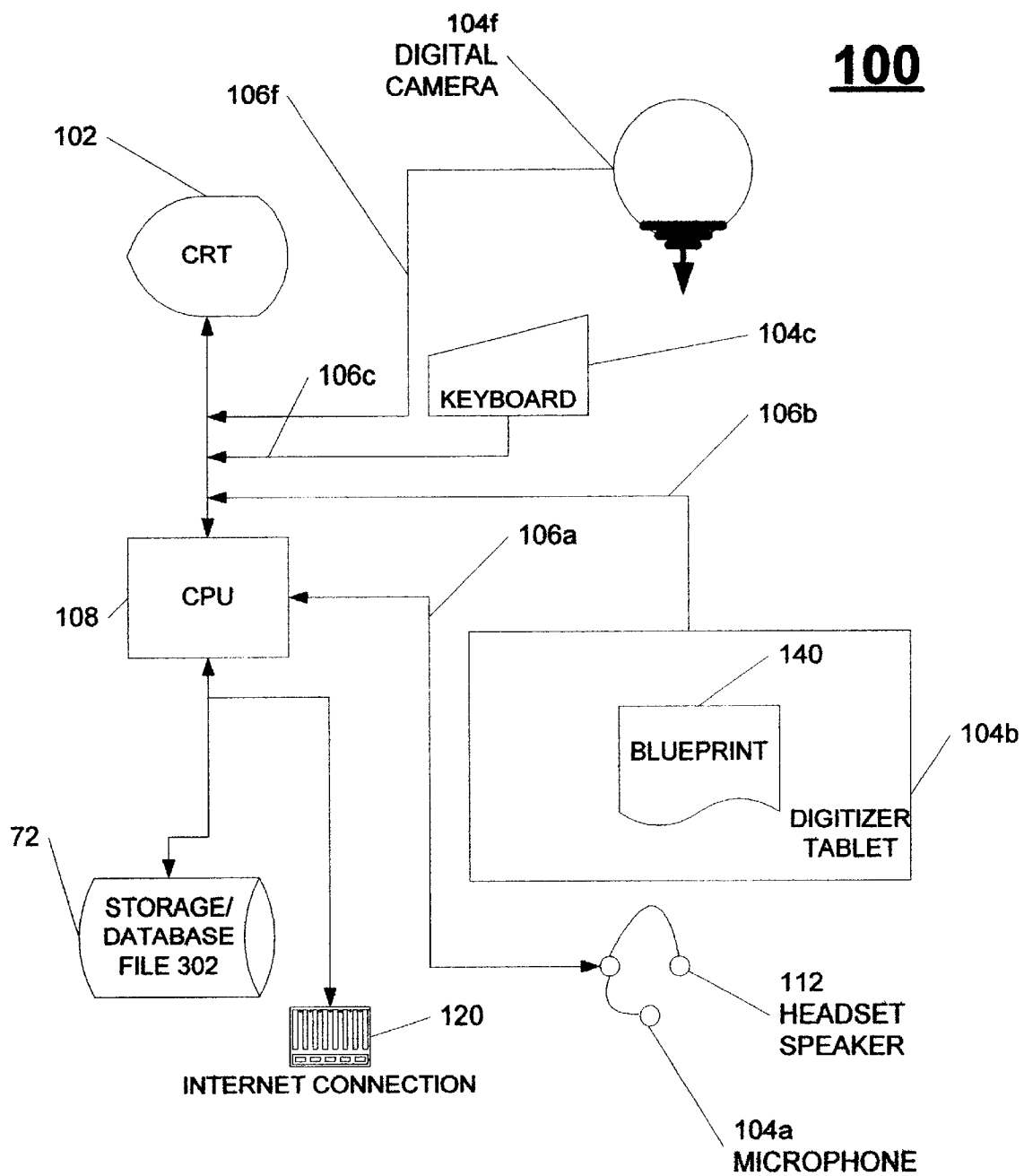

Referring now to FIGS. 2A, B, there are shown hardware representations 100 of construction quantity takeoff system 10. Hardware representations 100 set forth further details on devices suitable for use in construction quantity takeoff system 10 in performing the method of the present invention. For example, an additional input device, digitizer input device 104b, is set forth in hardware representation 100. It will be understood that the devices disclosed herein are only by way of illustration and are not intended to be exhaustive of the devices that can be used within the hardware of construction quantity takeoff system 10.

Hardware representations 100 include information input devices 104a–f. Information input devices 104a–f include speech input device 104a, digitizer input device 104b and keyboard input device 104c as previously described. Additionally, probe input device 104d, data file input device 104e, image input device 104f and any other input device that the estimator finds useful can be used to receive input information within quantity takeoff system 10.

The input information from input devices 104a–f is applied to CPU 108. CPU 108 is programmed to perform the various data processing and data transfer operations of construction quantity takeoff system 10. The operations performed by CPU 108 include, for example, the required voice processing of block 38, the storing and applying of construction vocabularies to the voice processing module of block 38, as shown in block 42, and the filtering of the string resulting from the voice processing operations within block 38.

The operations performed by CPU 108 within quantity takeoff system 10 also include the voice based computations of block 48, the scheduling and cost calculations of block 60, the data transfers of block 64 and the report generation of block 68. CPU 108 provides its output, by way of appropriate interface circuitry, to an audio visual display system or printer 76 as previously described. The audio system can be headset speaker 112. The visual display system can be CRT 102.

In order to perform an Internet distribution of the output information as shown in block 84 an Internet connection 120 is provided. Additionally, a client Internet connection is required in order to permit the client to receive the output information of quantity takeoff system 10 distributed by way of Internet connection 120, as shown in block 124. The client receiving the output information from CPU 108 must have its own client CPU and its own storage device 132 in order to receive and process the output information from quantity takeoff system 10. The client output produced by the client CPU and storage device 132 is shown in block 136 and can be in any form.

When applying input information to construction quantity takeoff system 10 using digitizer input device 104b, the estimator places a blueprint(s) 140 upon the digitizer tablet of digitizer 104b. Input information representative of blueprint(s) 140 is obtained by digitizer input device 104b and applied to CPU 108, as previously described, by way of input line 106b. Using the conventional digitizer input device the estimator touches or clicks on the corner points of an area to be measured on a blueprint in order for quantity takeoff system 10 to determine the area bounded by lines joining the indicated points to each other.

Image input device 104f is preferably disposed in a location above blueprint(s) 140 in order to more easily obtain camera images of blueprint(s) 140. The output signals of image input device 104f are applied to CPU 108 by way of input line 106f. Additionally, output from audio input device 104a is applied to CPU 108 by way of line 106a. If a drawing wheel or other electronic measurement device is used by the estimator it is coupled to CPU 108 in the same manner.

In this manner, corresponding input information from digitizer input device 104b, image input device 104f, and audio input device 104a can be applied to CPU 108 at substantially the same time under the control of the estimator. Thus, using the hardware of hardware representations 100, the estimator can index the video images of blueprint 140 from image input device 104f to the corresponding input information entered by the estimator using audio input device 104a or digitizer input device 104b. The signals representative of the video image and the entered input information, are stored within storage device 72, as described in more detail below.

The ability to associate video images with their corresponding input into quantity takeoff system 10 can be used to permit subsequent estimator training exercises. In these training exercises the associated input information is reviewed and studied in connection with the portion of blueprint(s) 140 viewed by the estimator at the time of the input. The indices associating the video image input information with the corresponding audio and digitizer input information are also stored in storage device 72.

Figure 3:
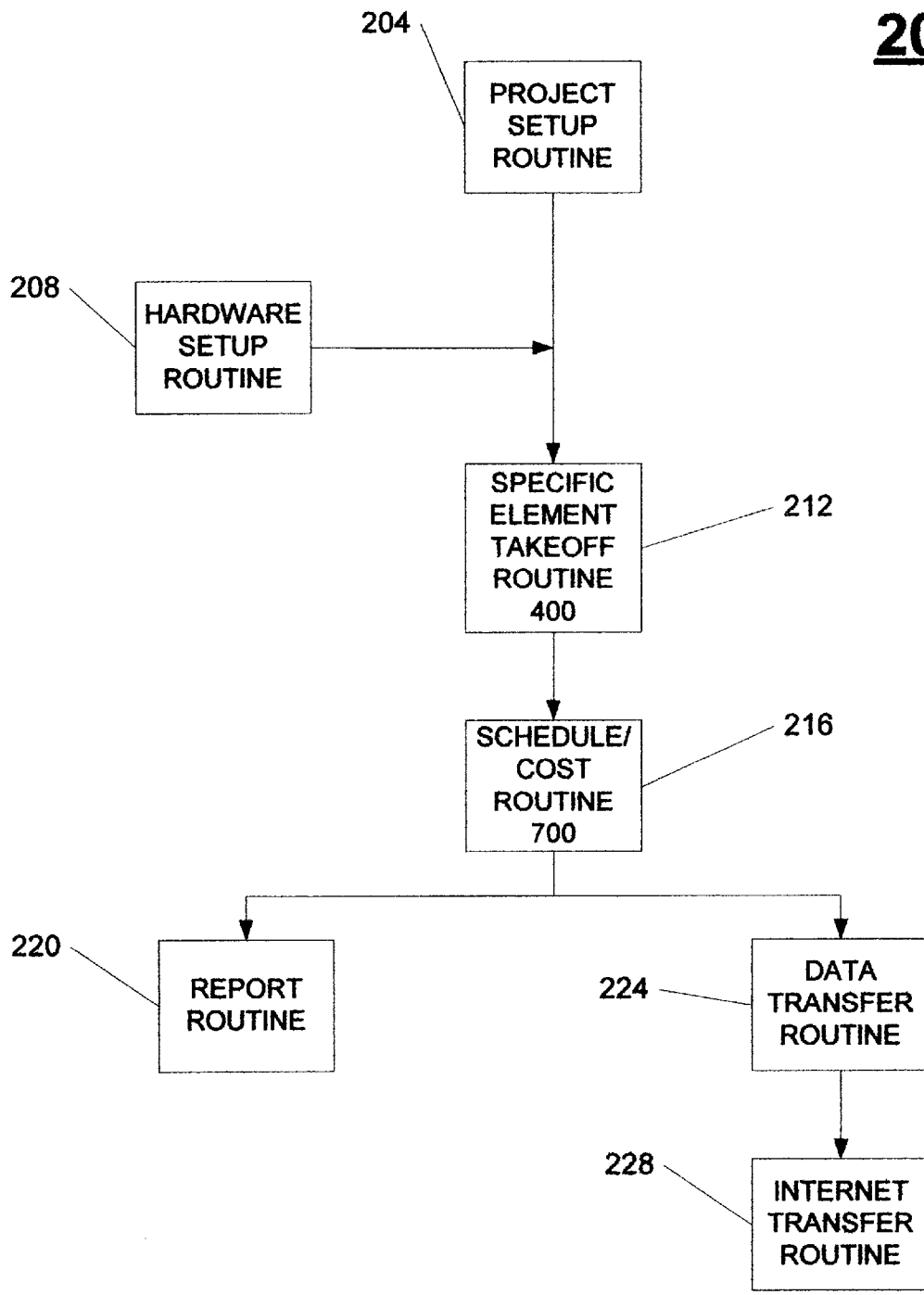
FIG. 3 shows a processing flow chart representation of operations performed within the construction quantity takeoff system of FIG. 1 in order to perform the method of the present invention.

Referring now to FIG. 3, there is shown processing flow chart 200. Processing flow chart 200 is a high level flow chart representation of the operations performed within construction quantity takeoff system 10 in order to practice the method of the present invention when performing a quantity takeoff and cost estimates based upon blueprints 140 representing a construction project.

In processing flow chart 200 project setup routine 300 is performed as shown in step 204. The details of project setup routine 300 are set forth below. Additionally, a hardware setup routine is performed in step 208 of processing flow chart 200. Any method of performing a hardware setup can be used within construction quantity takeoff system 10. For example, the estimator can be required to perform the function of instructing quantity takeoff system 10 which hardware devices are being used. Alternately, quantity takeoff system 10 can be programmed to read its ports and make the determination of the hardware devices itself.

Input information representing the items to be estimated from blueprints 140 is entered by the estimator. Specific element takeoff routine 400 is then performed in order to receive the input information for each item entered as shown in step 212. The operations of specific element takeoff routine 400 are described in more detail below. When the input information of all of the items of the construction project is received by construction quantity takeoff system 10, execution of processing flow chart 200 proceeds to step 216, where the schedule/cost routine 700 is performed.

The operations of schedule/cost routine 700 shown in step 216 perform the basic construction management tasks of cost estimating, scheduling, and determination of resource requirements. Performance of these tasks provides a Standard Cost and Schedule that can serve as a project benchmark that is well known to those skilled in the art. Using the present invention, the Standard Cost and Schedule an be modified as required by individual entities in the construction process to produce an actual estimate without unnecessary manual labor. Further details of schedule/cost routine 700 are set forth below.

Because cost and schedule information are linked to their corresponding items in database file 302, the estimator can automatically perform tasks that were previously separate steps in the project bid and project management processes. Several commercially available services such as available from the R. S. Means Company, Kingston Mass. provide cost and production rate information in Construction Specification Institute (CSI) format that can be linked to the item fields in database file 302 of quantity takeoff system 10. The CSI format is well known by those skilled in the art. Unit costs from commercial products, the manpower and equipment required for the work, and an estimated production rate can be used to develop cost estimates and scheduled duration at the same level of detail as contained in the quantity takeoff without additional human intervention. The CSI formatted cost/production data must be augmented to make this automated process workable. Each CSI code must be assigned additional schedule priority and scope information to permit automatic generation of Critical Path Method (CPM) activity networks.

In the scheduling performed in step 216, a schedule priority value for indicating a logical precedence of the items is determined using scheduling templates. For example, a scheduling template can be determined by recognizing that excavation work generally precedes foundation work, that foundation work generally precedes the construction of a building, and so on. Therefore, excavation work has a lower priority value than foundation work and foundation work has a lower priority value than, for example, work on constructing a building. Priority codes are assigned to each CSI entry in the cost table, or to each item entered into quantity takeoff routine 10, so that general, Standard, priority is established.

Construction projects usually have some non-standard activity precedence. Therefore, schedule scope values are provided to improve on the simple application of schedule priority values set forth above. The schedule scope value provided in this manner indicates a logical grouping of tasks. Global tasks, such as earthwork and excavation work, are performed in sequence as a single group of operations. Local tasks, within the global tasks, are performed according to schedule priority values by location. For example, the element table described by database file 302 can contain five locations with earthwork and concrete footing activities. Since both earthwork and concrete footing scope values are global, then all five earthwork activities are completed before the five concrete footing activities.

The location coordinates stored in database 302 can be used to divide the project into additional phases or areas of operation. Using Geographical Information System (GIS) techniques, the activities of the project can be grouped in many ways. For example the activities can be grouped by elevation, i.e. floor by floor in a building. Alternately, the activities can be grouped by zone or phase. Spatial accounting can be performed using the output data of quantity takeoff system 10 wherein the number of workers required in an area and the number of person hours required in an area are determined. Additionally, the time periods during which the hours of work are required in an area can be determined. In an alternate embodiment, Global Positioning System (GPS) input is used for these purposes.

After the scheduling and costs determinations of step 216, processing within processing flow chart 200 can proceed to a report routine as shown in step 220. Within step 220 a report is provided to the estimator. Alternately, the determinations of step 216 can be applied to a data transfer routine for distribution to any entities as shown in step 224. The data transfer can be performed by way of the internet as previously described with respect to block 84 using an internet transfer routine as shown in step 228.

Figure 4:
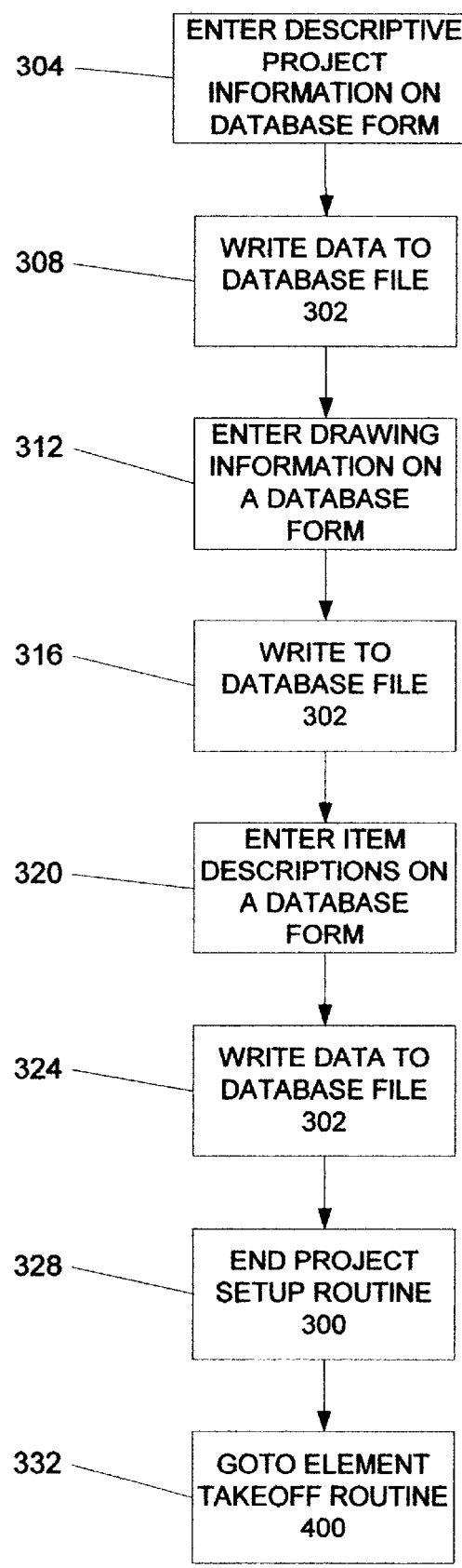
FIG. 4 shows a flow chart representation of the operations performed within the project setup routine of the construction quantity takeoff system of FIG. 1.
Figure 6A:
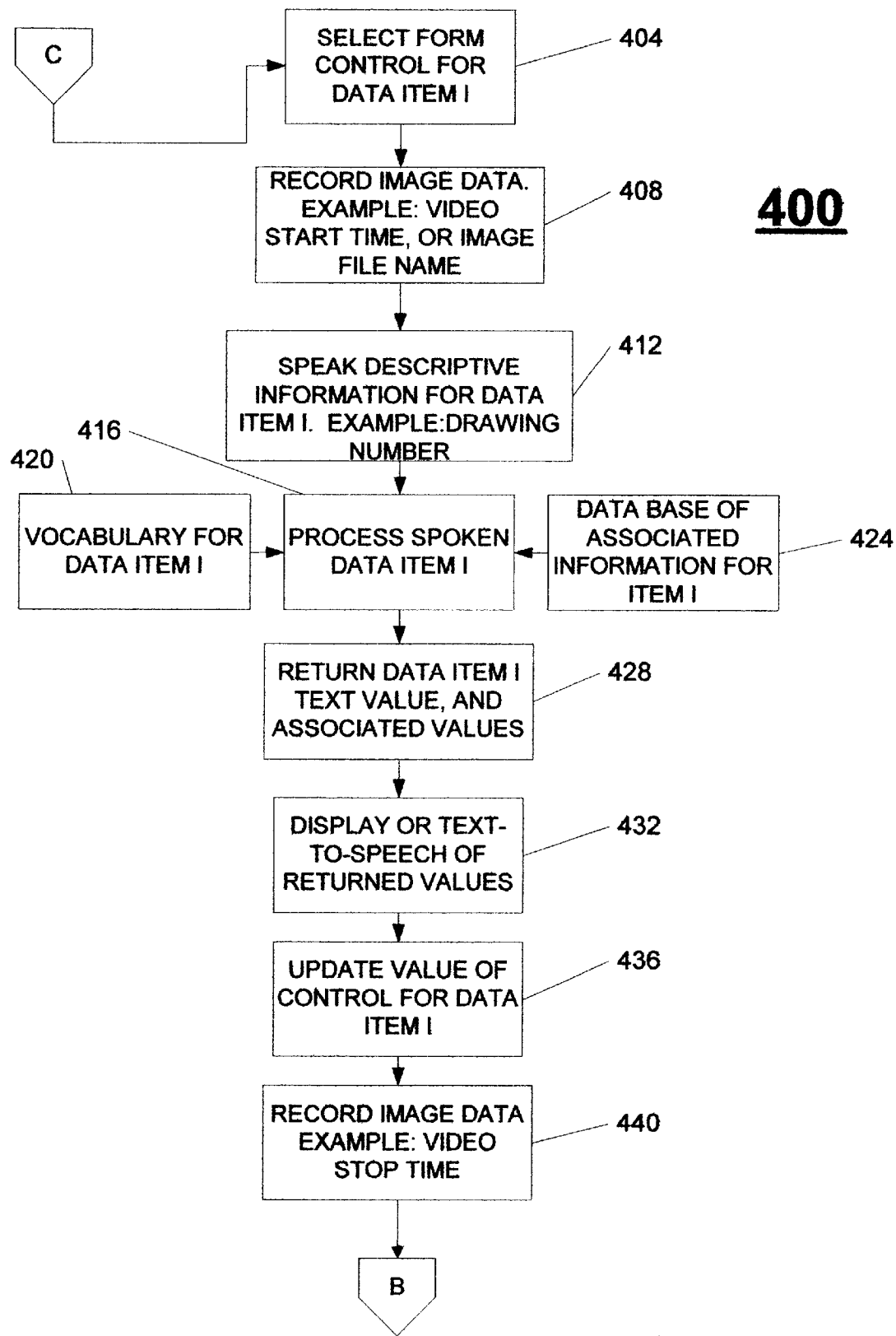
FIGS. 6A–C show a flow chart representation of the operations performed within the quantity takeoff routine of construction quantity takeoff system of FIG. 1.
Figure 6B:
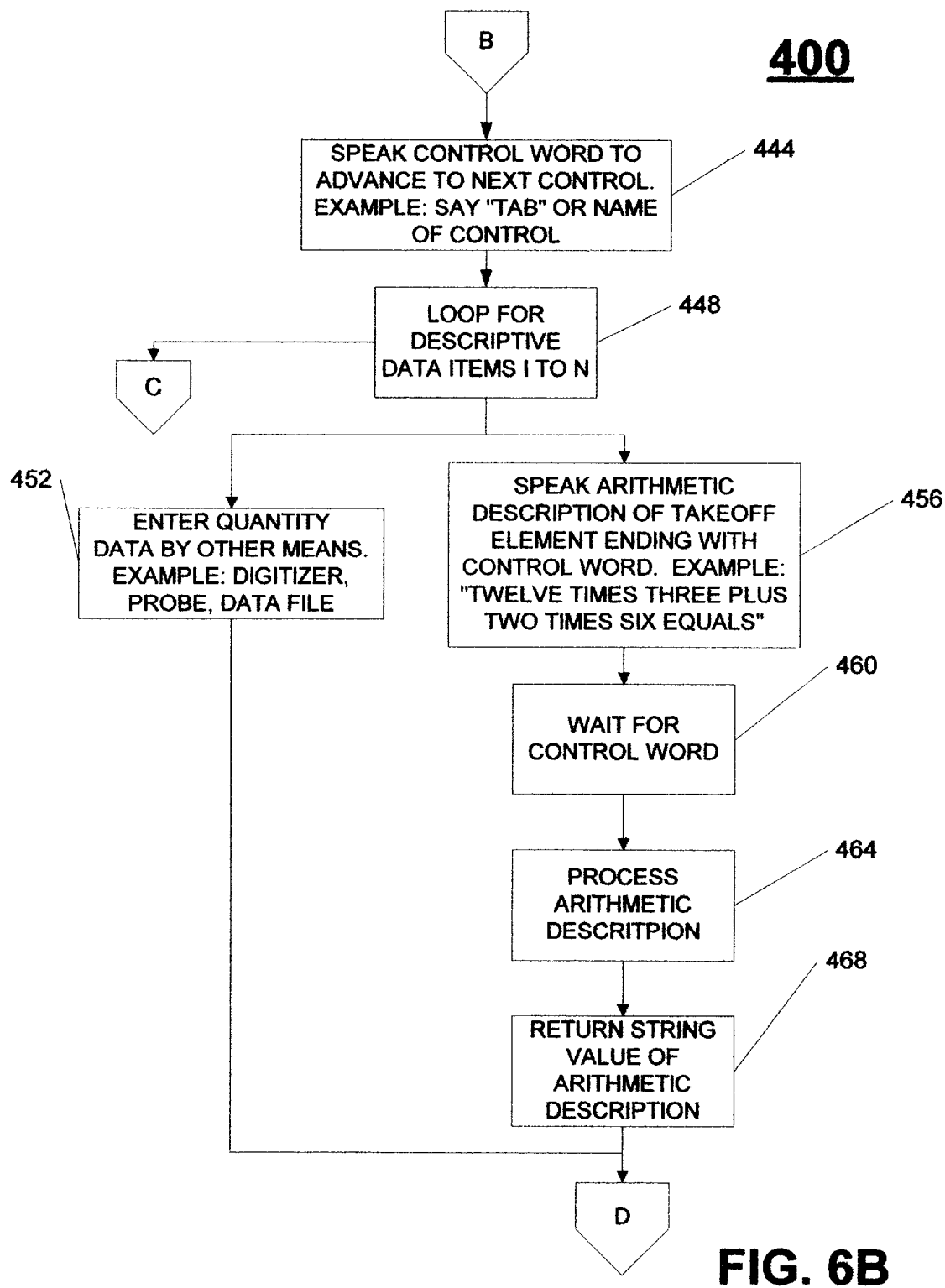
Figure 6C:
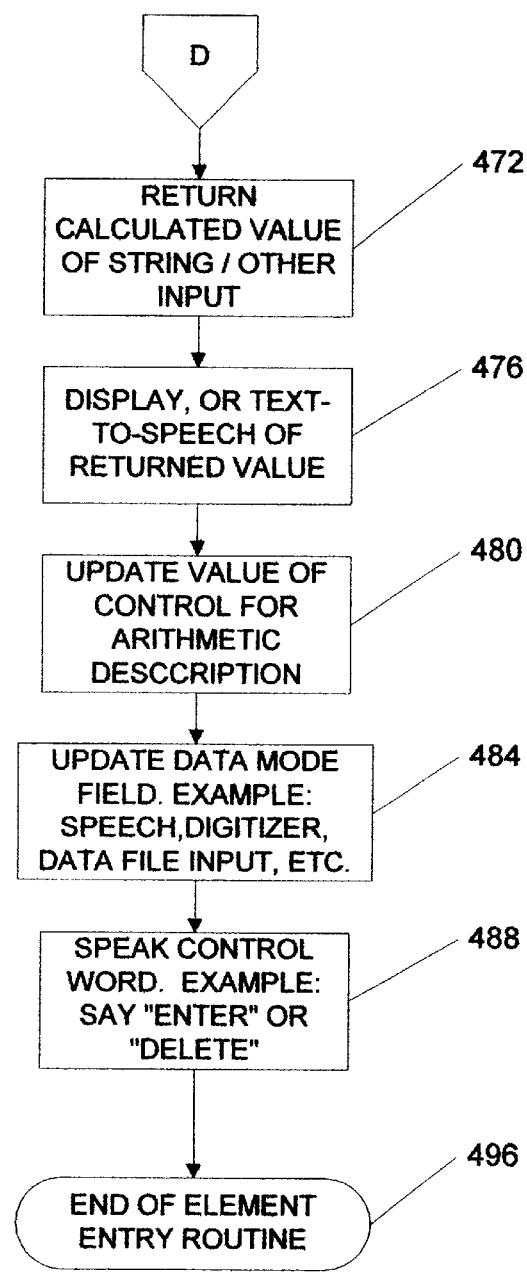

Referring now to FIGS. 4, 5, there are shown project setup routine flow chart 300 and database file 302. Project setup routine flow chart 300 is performed within construction quantity takeoff system 10 in order to permit construction quantity takeoff system 10 to receive and process the input information applied by the estimator. Database file 302 is provided within construction quantity takeoff system 10 for receiving, associating, and outputting takeoff information applied to construction quantity takeoff system 10 by the estimator.

In order to permit association of the input information with its corresponding identifying information, the estimator enters descriptive project information with respect to the construction project for which the estimate is performed. The descriptive project information can be entered by the estimator using a database form. The entering of the descriptive project information by the estimator is shown in step 304. The descriptive project information can be inserted into column 5 of database file 302 and later associated with its corresponding items within database file 302.

The descriptive project information entered by the estimator can include the name of the construction project, a construction project number, the location of the construction project, a company name, and any other information useful for identifying the input information entered by the estimator. In step 308, the descriptive project information is stored in column 5 of database 302 as previously described. The field of column 5 within database file 302 is a link field using conventional relational database techniques to show the relationship of the various items of descriptive project information provided by the estimator.

Drawing information is also entered within project setup routine flow chart 300 as shown in step 312. The drawing information is also stored in database file 302 as shown in step 316, for example in column 6. An item description for each item of the construction project for which the estimator must determine a cost is entered into construction quantity takeoff system 10 in step 320, for example in column 8 of database file 302. Additionally, the corresponding identifying information for each item is entered. The identifying information entered in step 320 can include, for example, an item number, a description, a specific reference or any other useful information.

The identifying information of step 320 is written into database file 302 in step 324. Any other information desired by the estimator can also be entered into database file 302, or, in an alternate embodiment, into any other database files that may be created. In this manner all of the takeoff information is aggregated and can be distributed together. Project setup routine flow chart 300 then terminates as shown in step 328 and execution of flow chart 300 is followed by execution of element takeoff routine 400, as shown in step 322.

Referring now to FIGS. 6A–D, there is shown element quantity takeoff routine 400. Element quantity takeoff routine 400 is used within construction quantity takeoff system 10 to determine the quantity and cost of each item i entered by the estimator. In element quantity takeoff routine 400, a form control is selected for a data item i in step 404. In step 408 the image data from video camera 104*f* is recorded. The image data permits the input information, such as the input from speech input device 104*a* and digitizer input device 104*b*, to be indexed to its corresponding image from camera 104*f*. Thus, when video camera 104*f* provides current image data representative of blueprint(s) 140 the start time or image file name corresponding to the current image data can be entered into column 2 of database 302 in step 408.

The descriptive information for a data item i is then spoken in step 412. In the preferred embodiment of construction quantity takeoff system 10, the estimator speaks the input information of steps 404, 412 into microphone 104*a*. The spoken input information of item i is then processed in step 416 of quantity takeoff routine 400.

When the spoken input information is processed, a vocabulary that is relevant to item i is applied to the speech engine as shown in step 420 of element quantity takeoff routine 400. The vocabulary applied in step 420 can be a subset of the total vocabulary available within the speech engine of quantity takeoff system 10. In the preferred embodiment of the invention a determination is made in step 416 to verify that the vocabulary of item i is within the vocabulary applied in step 420. Additionally, the associated information of item i stored in database file 302 is applied to the output of the voice processing operations of step 416. The information corresponding to item i can include, for example, the coordinates of the item i. In order to permit the coordinate information to be entered, the system of the present invention can be programmed to ask the estimator whether such entry is desired.

The text value and the associated values of data item i are returned in step 428 and displayed or spoken by a text to speech device as shown in step 432 in order to provide feedback for the estimator. The returned values can be applied to the estimator using headset speaker 112 as spoken by a text-to-speech device in step 432. The value of the control for data item i is updated in step 436.

Further record image data is received in step 440 in order to permit further indexing of the input information to its corresponding image data. For example, the video stop time of video camera 104f can be recorded in step 440. The estimator speaks a selected control word for advancing the processing of element quantity takeoff routine 400 to the next control as shown in step 444. If additional items must be inputted execution of routine 400 returns to step 404 by way of off-page connector C in order to process the next data item i, or i+n, as shown in step 448. During the execution of steps 404–444 quantity takeoff system 10 thus receives and processes the input related to descriptive data items such as the sheet identification, the location, or the item. This execution is repeated for each of the descriptive data items of blueprint(s) 140 for which a takeoff is performed.

In the preferred embodiment of the invention, element quantity takeoff routine 400 permits data to be entered by speaking an arithmetic description of a takeoff element as shown in step 456. Alternately, as previously described, the quantity data can be entered by any other input devices, such as input devices 104a–f in step 452.

If the arithmetic description of the takeoff element is spoken to the construction quantity takeoff system 10 as shown in step 456. Thus, step 456 begins the receiving and processing of the numeric entries by the estimator. This reception of arithmetic input information is continued until a control word is encountered as shown in step 460. When the control word is encountered the arithmetic description is processed in step 464 and a string value is returned in step 468. The processing of the arithmetic description is set forth in more detail below.

In step 472 a calculated value of the string from step 468 or other input from step 452 is returned. The returned value is displayed or computer spoken as shown in step 476. The value of control for the arithmetic description is updated in step 480. The data mode field of database file 302 is updated in step 484. The update of the data mode field records the name of the input device 104a–f which originated the arithmetic value.

Referring now to FIGS. 7A–C, there are shown estimator utterance charts 412 setting forth the verbal dictations performed by an estimator in order to apply input information to construction quantity takeoff system 10. Estimator utterance charts 412 include six records, labeled record 0 to record 5. Each of the six records within utterance charts 412 corresponds to one of the six rows of data within database file 302. Each of the separate rows within a single record corresponds to an utterance of the estimator. The combined utterances within all of the rows of a single record form the utterance required for the estimator to input the data stored in the corresponding row of database file 302.

Figure 8:
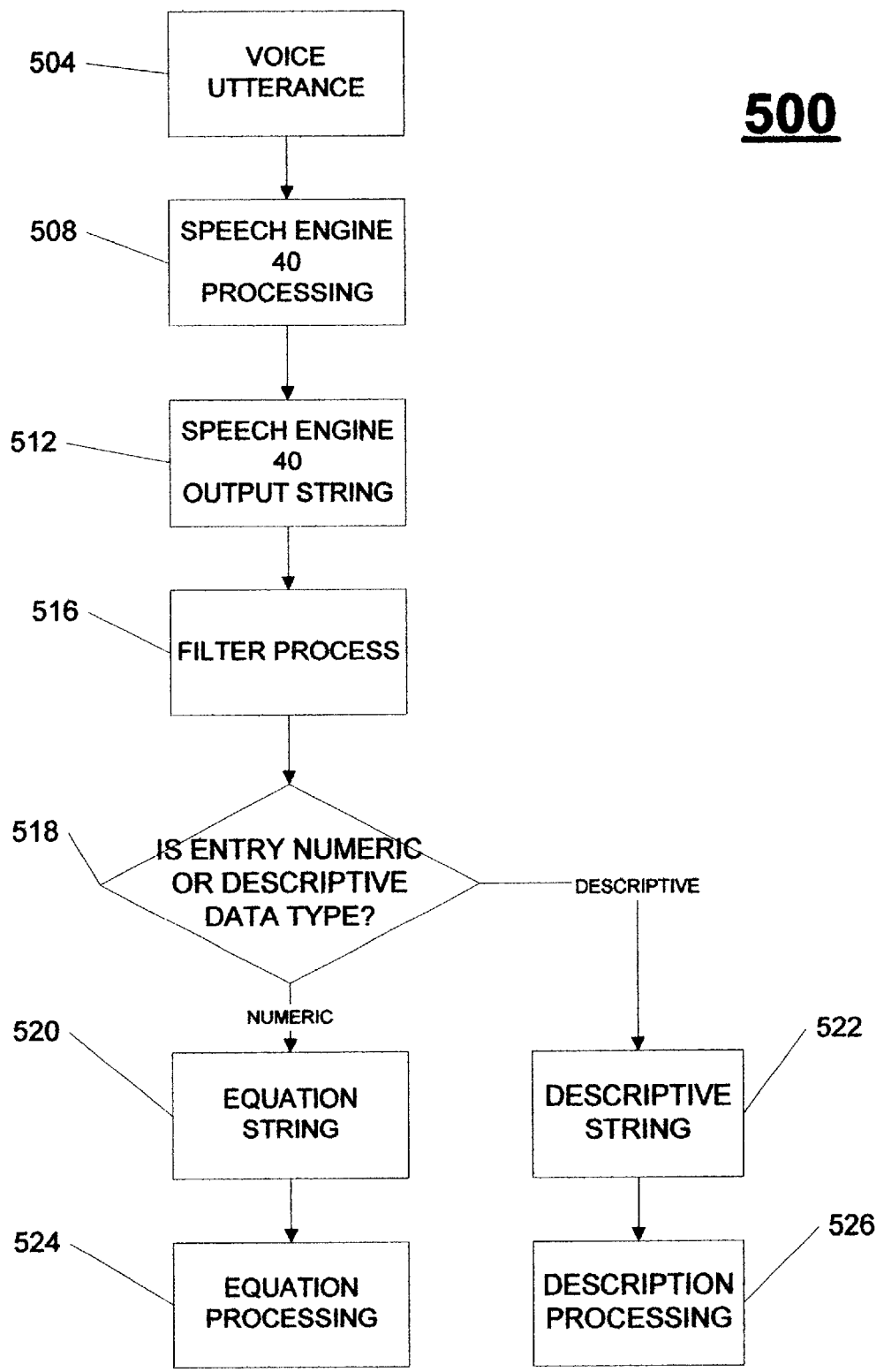
FIG. 8 shows a high level flow chart representation of the operations performed within the speech processing routine of construction quantity takeoff system of FIG. 1.

Referring now to FIG. 8, there is shown speech processing flow chart 500. Speech processing flow chart 500 is a high level flow chart representation of the operations performed within construction quantity takeoff system 10 in order to process input speech from an estimator received by way of microphone 104a. This processing is performed by taking advantage of the limited context of the expected outputs provided by quantity takeoff system 10. Furthermore, this permits efficient filtering and testing of the speech inputs. The operations of speech processing flow chart 500 are performed by CPU 108 within the voice processing module of block 38 using a conventional speech engine adapted for the operations of construction quantity takeoff system 10.

In speech processing flow chart 500, the estimator performs a voice utterance as shown in block 504. Electrical signals representative of the voice utterance are generated and the speech engine within construction quantity takeoff system 10 processes the electrical signals shown in step 508. A speech engine output string is formed in step 512. The speech engine output string is filtered in block 516. Specialized filtering, as set forth below, is performed in the preferred embodiment of quantity takeoff system 10 because of the limited contextual information available to the speech engine therein. In step 520 an equation string is determined from the output of the filtering performed in step 516. The equation of step 520 is processed in step 524.

Thus, the filtering operation as shown in step 516 is performed substantially directly upon the speech engine output provided in block 512. This permits construction quantity takeoff system 10 to anticipate and correct speech processing errors that would otherwise not become apparent until farther downstream in the estimation process. The early anticipation and correction of speech processing errors, and therefore the limiting of the range of outputs from the speech engine, substantially improves the results of quantity takeoff system 10.

In particular, anticipation and correction of errors by quantity takeoff system 10 avoid much of the visual scanning and manual correction by the estimator that are otherwise required. Reducing visual scanning and manual correction by the estimator reduces estimator fatigue and reduces the opportunities for the estimator to make an error. As described in more detail below the identifying of potential errors by quantity takeoff system 10 rather than by the estimator is possible because system 10 is programmed to recognize legitimate speech processing output and to recognize likely errors.

In decision 518 a determination is made whether an entry is numeric or descriptive data. If the entry is numeric it is an equation string and equation processing is performed as shown in blocks 520, 524 and previously described with respect to block 456 et. seq. If the entry is descriptive it is treated as a descriptive string and processed as such in blocks 522, 526 as previously described with respect to blocks 404, 448.

Figure 9A:
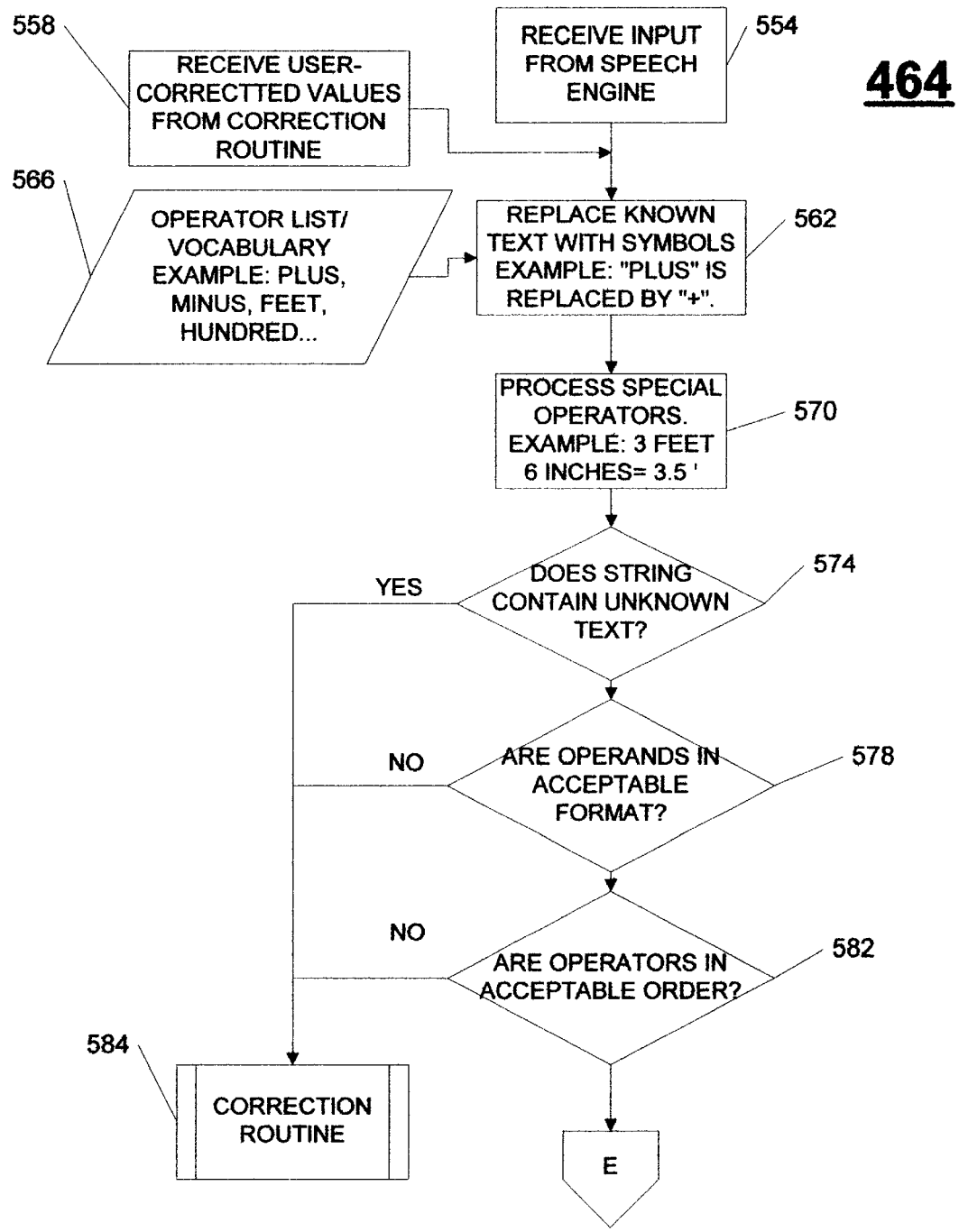
FIGS. 9A, B show a flow chart representation of the operations performed upon the output of the speech engine within the arithmetic filtering routine of the construction quantity takeoff system of FIG. 1.
Figure 9B:
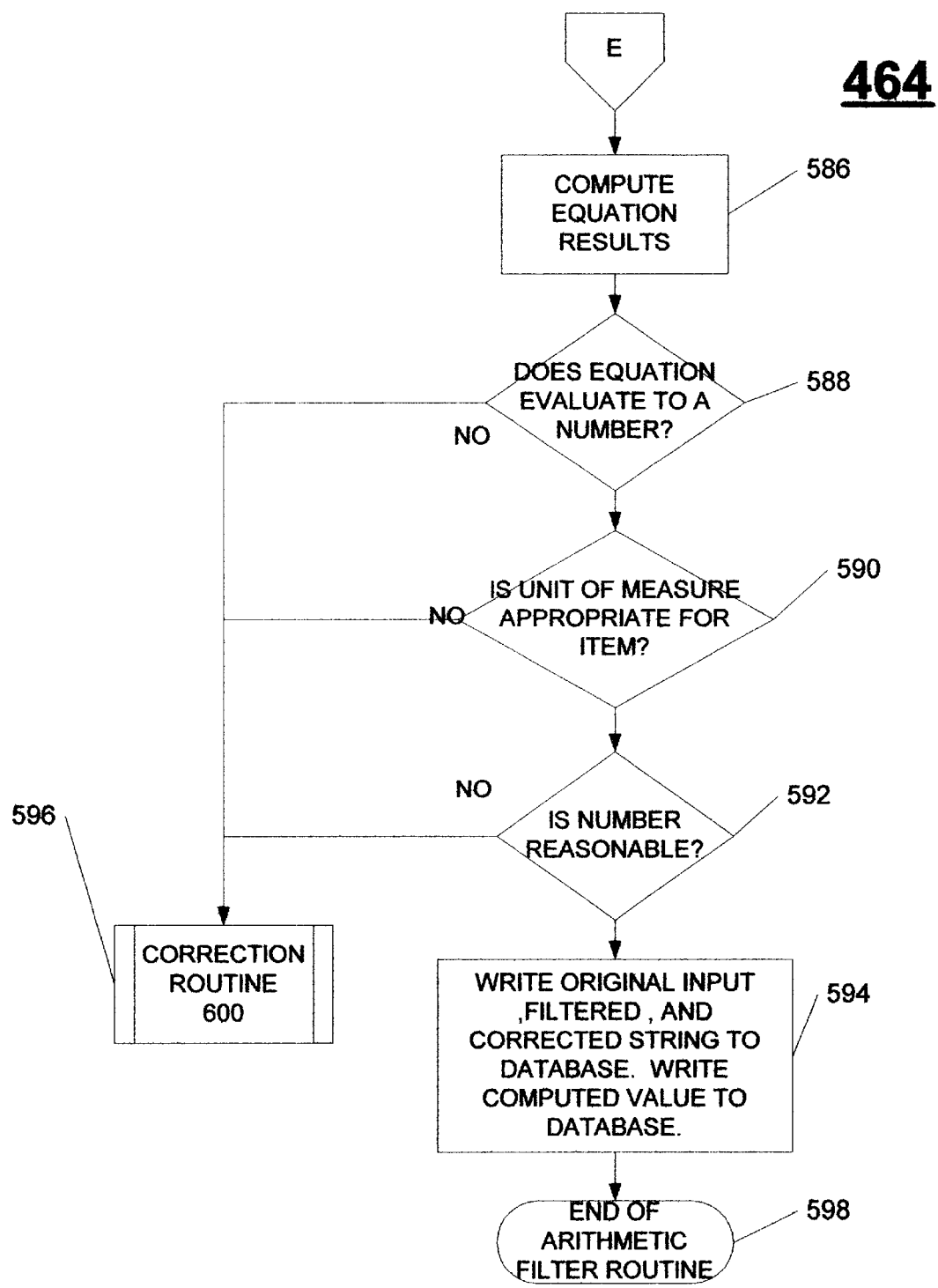

Referring now to FIGS. 9A, B, there is shown arithmetic filter flow chart 464 for correcting inaccuracies in the output of the speech engine of quantity takeoff routine 10 specifically for arithmetic input. Arithmetic filter flow chart 464 is a representation of the filtering operations performed by CPU 108 in connection with the operations of the voice processing module of block 38 within construction quantity takeoff system 10.

Within arithmetic filter flow chart 464, filter input is received from the speech engine in step 554. The filter input received in this manner is the processed output of the speech engine of voice processing module 38. Estimator corrected values from a correction routine within the operator feedback module of block 52 can be applied to the input from the speech engine in step 558. An operator list or a predetermined vocabulary is applied in step 566. Known text in the filter input is replaced with its corresponding symbols in step 562. For example, the word "plus" is replaced with a plus sign and the word "minus" is replaced with a minus sign.

Special operators are processed in step 570. If the resulting string from the processing of step 570 contains unknown text, as determined in decision 574, execution of filter flow chart 464 proceeds to arithmetic correction routine 600 within step 584. Arithmetic correction routine 600 is set forth in more detail below. If no unknown text is encountered, a determination is made in step 578 whether the operands of the string are in an acceptable format. If they are not in an acceptable format, execution of filter flow chart 550 proceeds to arithmetic correction routine 600 in step 584, as previously described with respect to the determination of step 574. If the operands of the string are in an acceptable format a determination is made whether the operators are in an acceptable order in decision 582. If the operators are not in an acceptable order, execution of filter flow chart 464 proceeds to arithmetic correction routine 600 of step 584.

If the tests of decisions 574, 578, 582 are met the equation results are computed in step 586. If the equation does not evaluate to a number in step 586, as determined in decision 588, execution proceeds to arithmetic correction routine 600 as shown in step 584. Additionally, if an appropriate unit of measure is not found for the item in step 590 execution proceeds to correction routine 600. A determination can be made in step 592 whether the output number of the requested calculation of step 586 is reasonable. For example, a determination can be made whether the magnitude is inappropriate for the item i or the units are inappropriate for the item i.

Thus, additional errors that may escape detection in decisions 574, 578, 582 can be detected in decisions 588, 590, 592. It is the operations of decision 574 through decision 592 that permit quantity takeoff system 10 to anticipate and correct speech engine errors early in the information input process, thereby relieving the estimator of much of the burden of recognizing and correcting the errors.

If the output number calculated in step 586 is determined to be reasonable in decision 592, the original input string from the speech processing engine, the filtered string, the corrected string, and the computed value of the equation are written into database file 302 in step 594. Execution of arithmetic filter flow chart 464 terminates in step 598.

Figure 10:
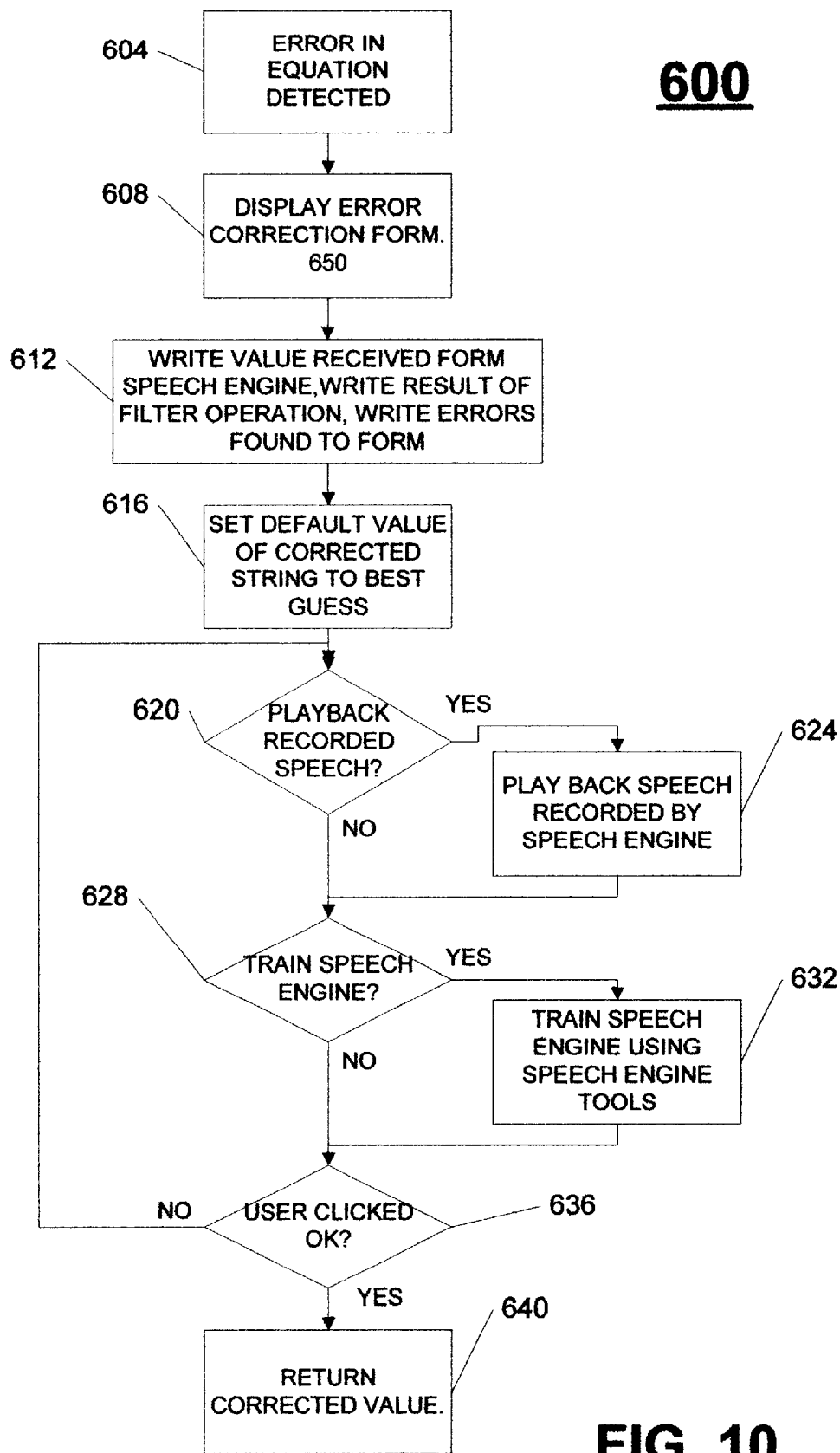
FIG. 10 shows a flow chart representation of the arithmetic operations performed upon the output of the speech engine when a speech processing error is detected within the construction quantity takeoff system of FIG. 1.
Figure 11:
FIG. 11 shows the error correction form used to provide feedback on possible speech processing errors to an estimator and to obtain feedback from an estimator within the arithmetic correction routine of FIG. 10.

Referring now to FIGS. 10, 11, there are shown arithmetic correction routine 600 and error correction form 650. Arithmetic correction routine 600 operates within arithmetic filter flow chart 550 to correct strings from the voice processing engine. Error correction form 650 is used by quantity takeoff system 10 to communicate detected errors to the estimator.

When an error in an equation from the voice processor of block 38 is detected as shown in step 604 of correction routine 600, correction form 650 is displayed to the estimator as shown in step 608. The information displayed in correction form 650 includes the received value of the speech engine input string, the result of the filter operations performed in arithmetic filter flow chart 550, and the located errors, as set forth in step 612. An error description is also included in error correction form 650. The default value of the corrected string is set to the best guess in step 616.

A determination is made in decision 620 whether recorded speech should be played and if so the recorded speech is played in step 624. This determination is made according to whether the estimator activates the playback speech button of correction form 650. If there was an error in the speech the estimator makes a determination whether to train the speech engine as shown in block 628. The decision of the estimator with respect to training the speech engine is indicated using the Train Speech Engine button of correction form 650. If the speech engine is to be trained, conventional speech engine tools are used to perform the training as shown in step 632. A determination is then made in decision 636 whether the estimator has indicated that the string is corrected using the OK button of correction form 650.

In one example of the training that can be performed in step 632, the speech engine can be trained to better distinguish between the words "to," "too," and "two," One method of improving the ability of the speech engine to distinguish these words is to train the speech engine to consider the word that precedes the word being processed. For example, the speech engine can consider whether the preceding word was a number in order to assist in distinguishing the word "two."

Figure 12:
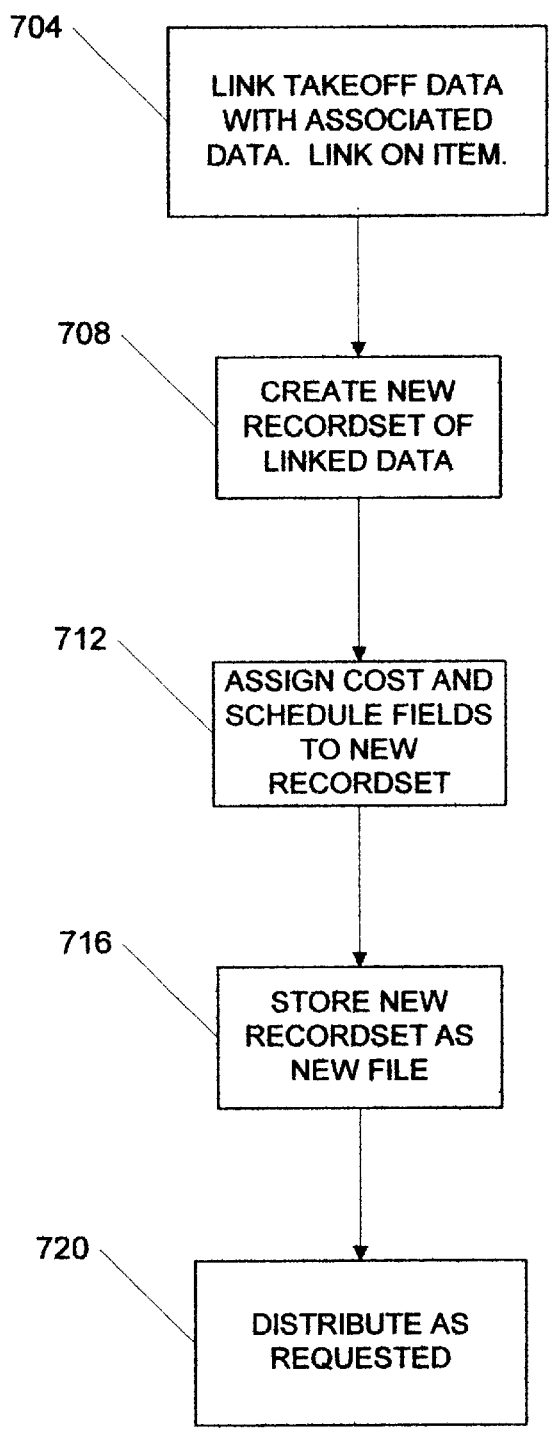
FIG. 12 shows the operations performed within the schedule/cost routine of the construction quantity takeoff system of FIG. 1.

Referring now to FIG. 12, schedule/cost routine 700 is shown. Schedule/cost routine 700 uses the takeoff information of database file 302 to determine the scheduling and costs of the construction project based upon the takeoff performed by the estimator. Scheduling within schedule/cost routine 700 can be performed using templates wherein, for example, items required for building a foundation are scheduled for delivery before items required for building a structure upon the foundation. In the same manner, the costs overtime of the project can be determined, wherein the costs for items used in the earlier stages are assumed to be incurred prior to the costs for items used in the later stages. In the preferred embodiment of the invention other entities perform their own scheduling and cost determinations based upon the information of database file 302 by applying their own production factors.

In step 704 of schedule/cost routine 700, the takeoff data of each item within database file 302 is linked with the associated data of the item. For example, in step 708 a new record set of linked data is created and the cost and schedule fields are assigned to the new record set in step 712. The new record set is stored as a new file in step 716 and distributed as requested in step 720.

Referring now to FIGS. 13A, B, C, there are shown quantity takeoff reports 750 provided in accordance with report routine block 220. Quantity takeoff reports 750 are merely examples of a large number of different types of reports that are possible using construction quantity takeoff system 10 in accordance with the input information obtained by an estimator from blueprints 140 specifying a construction project and tables 760, 770, 780 within quantity takeoff reports 750 are selected for illustrative purposes only. Table 760 illustrates a method for presenting the takeoff data provided by quantity takeoff system 10. Table 770 illustrates one method for presenting cost data determined according to the method and system of the invention. Table 780 shows schedule data derived from the present invention.

Without further elaboration, the foregoing will so fully illustrate the invention that others may, by applying current or future knowledge, readily adapt the same for use under various conditions of service.

I claim:

1. A method for determining construction quantity takeoff information of a drawing representative of a construction project having a plurality of information units including at least units of construction project information and information regarding a plurality of items associated with a drawing in an information gathering system, comprising the steps of:

(1) applying an indicia representative of a selected information unit of said plurality of information units to said information gathering system;

(2) determining said selected information unit by said information gathering system in accordance with said applied indicia;

(3) indexing said selected information unit and storing said indexed information unit in an indexed takeoff base;

(4) providing image data representative of said drawing; and (5) indexing said image data for storing said image data in said indexed database in association with indexed information unit.

2. The method for determining construction quantity takeoff information of claim 1, wherein said indexed image location is independent of a location within said drawing.

3. The method for determining construction quantity takeoff information of claim 2, comprising the further step of performing a quantity takeoff estimate in accordance with said indexed database.

4. The method for determining construction quantity takeoff information of claim 1, comprising the step of distributing said indexed takeoff database to provide a distributed takeoff database.

5. The method for determining construction quantity takeoff information of claim 4, comprising the step of collecting a fee in exchange for permitting access to said distributed takeoff database.

6. The method for determining construction quantity takeoff information of claim 4, comprising the step of submitting a bid in accordance with said distributed takeoff database.

7. The method for determining construction quantity takeoff information of claim 6, wherein said indexed takeoff database includes geographic information comprising the step of submitting said bid in accordance with said geographic information.

8. The method for determining construction quantity takeoff information of claim 1, comprising the step of determining the labor content of said construction project in accordance with said indexed takeoff database.

9. The method for determining construction quantity takeoff information of claim 1, including electrical signals representative of vocal indicia and a voice recognition system, comprising the further step of first determining said selected information unit by said voice recognition system in accordance with said electrical signals.

10. The method for determining construction quantity takeoff information of claim 9, including further electrical signals representative of further vocal indicia and said further indicia being representative of a selected item of said plurality of items and a quantity of said selected item, respectively, comprising the further step of second determining said quantity of said selected item by said voice recognition system in accordance with said further electrical signals.

11. The method for determining construction quantity takeoff information of claim 10, comprising the further step of performing said takeoff estimate in accordance with first and second determining steps.

12. The method for determining construction quantity takeoff information of claim 10, wherein at least one of said first and second determining steps comprises the step of performing voice filtering operations.

13. The method for determining construction quantity takeoff information of claim 12, comprising the step of determining a string value in accordance with said filtering operations.

14. The method for determining construction quantity takeoff information of claim 12, wherein said voice filtering operations comprise the step of determining whether the string value evaluates to a number.

15. The method for determining construction quantity takeoff information of claim 14, comprising the step of determining whether the string value evaluates to a reasonable number.

16. The method for determining construction quantity takeoff information of claim 13, comprising the step of determining whether said string value contains unknown text.

17. The method for determining construction quantity takeoff information of claim 13, wherein said string value has operands comprising a step of determining a format of said operands.

18. The method for determining construction quantity takeoff information of claim 17, comprising the step of determining an error in accordance with said format of said operands.

19. The method for determining construction quantity takeoff information of claim 13, wherein said string value has operands comprising the step of determining whether said operands are in a predetermined order.

20. The method for determining construction quantity takeoff information of claim 19, comprising the step of determining a processing error in accordance with said order of said operands.

21. The method for determining construction quantity takeoff information of claim 12, comprising the step of filtering in accordance with context specific filtered determinations.

22. The method for determining construction quantity takeoff information of claim 12, comprising the step of providing feedback to an estimator in accordance with said voice filtering operations.

23. The method for determining construction quantity takeoff information of claim 1, comprising the step of providing image data representative of said drawing in accordance with said selected information unit.

24. The method for determining construction quantity takeoff information of claim 23, comprising the further step of indexing said image data to said selected information unit.

25. The method for determining construction quantity takeoff information of claim 24, including an image input device for an estimator instruction input device for permitting an estimator to input and index said selected information unit and said selected image.

26. The method for determining construction quantity takeoff information of claim 24, comprising the further step of training an estimator in accordance with said indexed image and said indexed selected information unit.

27. The method for determining construction quantity takeoff information of claim 24, comprising the further step of storing an indexing time in said indexed database in accordance with a time of said indexing.

28. The method for determining construction quantity takeoff information of claim 1, comprising the further step of determining construction project information in accordance with said indexed database.

29. The method for determining construction quantity takeoff information of claim 28, comprising the further step of determining a construction project bid in accordance with said indexed database.

30. The method for determining construction quantity takeoff information of claim 28, comprising the further step of performing an item sale transaction in accordance with item quantity information within said indexed database.

31. The method for determining construction quantity takeoff information of claim 28, comprising the further step of determining cost information in accordance with said indexed database.

32. The method for determining construction quantity takeoff information of claim 28, comprising the further step of determining schedule information in accordance with said indexed database.

33. The method for determining construction quantity takeoff information of claim 32, wherein said schedule information comprises a schedule template.

34. The method for determining construction quantity takeoff information of claim 28, comprising the further step of determining location coordinate information in accordance with said indexed database.

35. The method for determining construction quantity takeoff information of claim 34, wherein said location coordinate information comprises elevation information.

36. The method for determining construction quantity takeoff information of claim 34, comprising the further step of determining said schedule information in accordance with said coordinate information.

* * * * *